US007076508B2

(12) United States Patent
Bourbonnais et al.

(10) Patent No.: US 7,076,508 B2
(45) Date of Patent: Jul. 11, 2006

(54) METHOD, SYSTEM, AND PROGRAM FOR MERGING LOG ENTRIES FROM MULTIPLE RECOVERY LOG FILES

(75) Inventors: Serge Bourbonnais, Palo Alto, CA (US); Elizabeth Belva Hamel, Morgan Hill, CA (US); Bruce G. Lindsay, San Jose, CA (US); Chengfei Liu, Rostrevor (AU); Jens Stankiewitz, Dorsten (DE); Tuong Chanh Truong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 10/217,707

(22) Filed: Aug. 12, 2002

(65) Prior Publication Data
US 2004/0030703 A1 Feb. 12, 2004

(51) Int. Cl.
*G06F 17/30* (2006.01)
(52) U.S. Cl. .................. 707/202; 707/101
(58) Field of Classification Search ........... 707/101, 707/102, 202, 201, 8
See application file for complete search history.

(56) References Cited

U.S. PATENT DOCUMENTS

| | | | | |
|---|---|---|---|---|
| 4,853,843 | A | * | 8/1989 | Ecklund ............... 707/203 |
| 5,440,727 | A | | 8/1995 | Bhide et al. ............ 711/117 |
| 5,491,819 | A | * | 2/1996 | Fatzinger et al. ......... 707/8 |
| 5,499,367 | A | | 3/1996 | Bamford et al. ......... 707/8 |
| 5,628,006 | A | * | 5/1997 | Fatzinger et al. ....... 707/202 |
| 5,675,791 | A | | 10/1997 | Bhide et al. ............ 707/205 |
| 5,878,414 | A | | 3/1999 | Hsiao et al. |
| 5,890,154 | A | | 3/1999 | Hsiao et al. ............ 707/8 |
| 5,946,689 | A | | 8/1999 | Yanaka et al. ........... 707/10 |
| 5,966,706 | A | * | 10/1999 | Biliris et al. ............ 707/10 |
| 5,991,771 | A | * | 11/1999 | Falls et al. ............ 707/202 |
| 6,192,365 | B1 | | 2/2001 | Draper et al. ........... 707/101 |
| 6,671,686 | B1 | * | 12/2003 | Pardon et al. ........... 707/8 |
| 6,856,993 | B1 | * | 2/2005 | Verma et al. ........... 707/101 |
| 2005/0138085 | A1 | * | 6/2005 | Verma et al. .......... 707/202 |

OTHER PUBLICATIONS

L. Lamport, "Time, Clocks, and the Ordering of Events in a Distributed System", ACM, vol. 21, No. 7, Jul. 1978.
M. Stonebraker, "The Case for Shared Nothing", University of California Berkley, pp. 1-5.
B. Lindsay, "Data Where You Want It When You Need It", IBM Corporation, DB2 and Business Intelligence Technical Conference, Oct. 2001, Session F-15.

(Continued)

*Primary Examiner*—Greta Robinson
(74) *Attorney, Agent, or Firm*—Janaki K. Davda; Konrad Raynes & Victor LLP

(57) ABSTRACT

Provided are a method, system, and program for merging independent log entries in a multiple node shared nothing DBMS. Initially, log entries from multiple log entries are combined to form a single log entry sequence. Local transactions are generated from the single log entry sequence and stored in a local transactions structure. In particular, log entries with the same local transaction identifier form a local transaction. Then, local transactions having the same global identifier are merged to form global transactions.

27 Claims, 25 Drawing Sheets

OTHER PUBLICATIONS

Y. Al-Houmaily, et al., "An Argument in Favor of Presumed Commit Protocol", Proc. Of 13th IEEE Intl. Conf. On Data Engineering, Apr. 1997.

"IBM DB2® Universal Database Enterprise—Extended Edition for Windows Quick Beginnings", Version 7, IBM Corporation, Document Ref. No. GC09-2963-00, 1993.

"IBM DB2® Universal Database Administrative API Reference", Version 7, IBM Corporation, Document Ref. No. SC09-2947-00, 1993.

"IBM DB2® Universal Database Replication Guide and Reference", Version 7, IBM Corporation, Document Ref. No. SC26-9920-00, 1993.

* cited by examiner

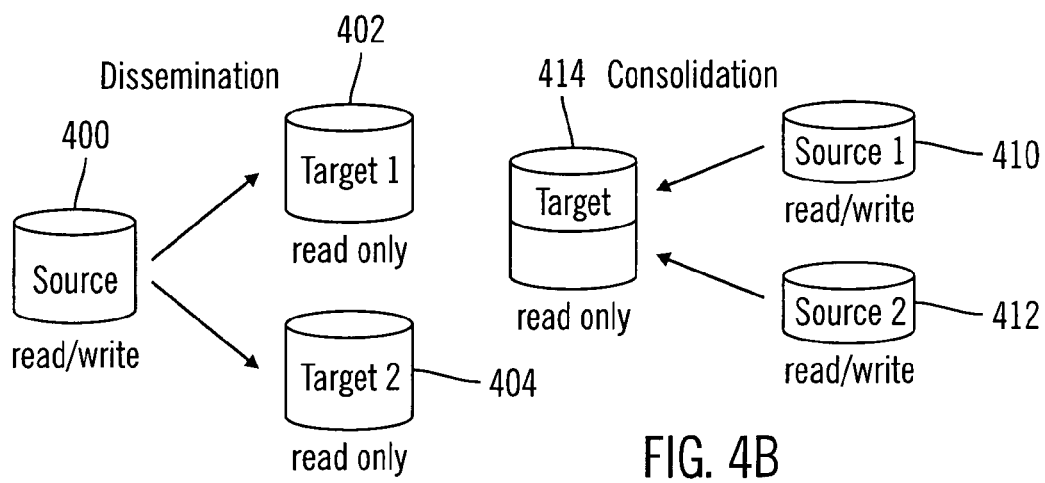
FIG. 4A
FIG. 4B
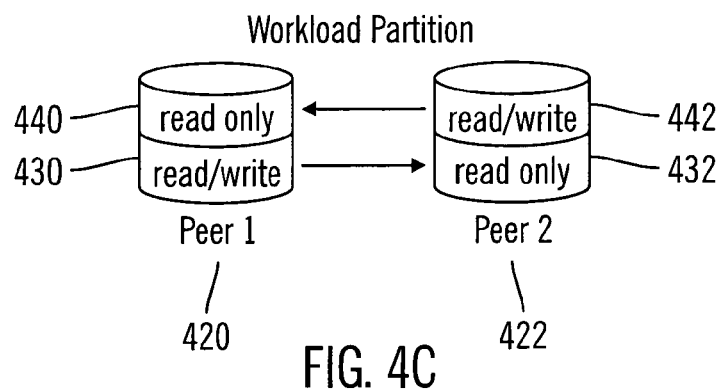
FIG. 4C

METHOD, SYSTEM, AND PROGRAM FOR MERGING LOG ENTRIES FROM MULTIPLE RECOVERY LOG FILES

BACKGROUND OF THE INVENTION

1. Field of the Invention

The present invention relates to a method, system, and program for merging log entries from multiple recovery log files.

2. Description of the Related Art

A database system is one in which data is stored, retrieved, and processed. Data records in a relational database management system (RDBMS) in a computer are maintained in tables, which are a collection of rows all having the same columns. Each column maintains information on a particular type of data for the data records which comprise the rows. Tables in the database are searched using, for example, a Structured Query Language (SQL), which specifies search operations or predicates to perform on columns of tables in the database to qualify rows in the database tables that satisfy the search conditions.

Whenever a business grows, the amount of data stored by the business also grows. Whenever the amount of data grows, so do the demands to the database systems that manage the data. Today, most of the business information is stored and processed in database systems, and the-demands to the database systems that handle this data are tremendous. Despite the fact that these database systems handle terabytes of data, end-users and applications have the same demands to the database systems as they had decades ago, when database systems did not handle as much data. End-users and applications demand high performance from database systems. For example, database systems are expected to provide short response times to user requests and are expected to be always available.

A non-distributed database system fails to meet these requirements. On the other hand, distributed database technology may be able to do so. Distributed database technology refers to a collection of logically related databases distributed over a computer network. Distributed database systems deal with the performance aspect of a database system. By using interconnected computer systems, it is possible to manage large databases of several terabytes and yet provide reasonable response times for complex database queries. DB2® Enterprise Extended Edition (DB2® EEE®) is a product available from International Business Systems, Inc. (IBM) for a distributed database management system. An enterprise is a business that utilizes computers. For further information, see IBM® DB2® Universal Database Enterprise—Extended Edition, "Quick Beginnings V7", Document Number GC09-2963-00, 2000, which is incorporated by reference herein in its entirety.

Distributed database technology was derived in the late 1970s due to a need to integrate data from several data sources into one database system and to achieve improved processing performance. For example, for a large company that manages several terabytes of data, a single database system was not able to handle the large amount of data and provide good performance. A solution to this problem was to exploit the power of parallel computing. But parallelism can only be achieved in a database system if the amount of data is split into several parts and manipulated in parallel. From the need for parallelism, came the need for distribution.

Data replication is the process of copying data from a source database to one or more target databases. Data replication provides many advantages to an enterprise's database system and gives businesses a sophisticated means to improve their database system's availability. Data replication allows businesses to have their data available where the businesses want the data and when the businesses need the data, by maintaining identical copies of a data source in several locations. Data replication is not tied directly to database technology. For example, data replication can also be found in file replication tools.

Data replication becomes more and more important for enterprises today. For example, the performance and the availability of a database system may highly increase by using data replication. DB2® DataPropagator (DPROPR®) is a product available from International Business Machines, Inc. (IBM) for relational data replication. For further information, see IBM® DB2® Universal Database, "Replication Guide and Reference V7", Document Number SC26-9920-00, 2000, which is incorporated by reference herein in its entirety.

There is a need in the art for combining distributed database technology and data replication for improved database systems.

SUMMARY OF THE PREFERRED EMBODIMENTS

Provided are a method, system, and program for merging log entries from multiple recovery logs. Local transactions are recorded within each recovery log using a local transaction identifier. Local transactions are merged to form global transactions across the multiple recovery logs using global transaction identifiers.

In certain implementations, each log entry for a single transaction includes a local transaction identifier, and each recovery log entry involved in commit processing for a global transaction includes a global identifier.

In additional implementations, one or more recovery log entries include a causally ordered, ascending timestamp that can be used to order global transactions.

In further implementations, a method, system, and program for restarting the merging of log entries from multiple recovery logs are provided. Restart information is held in persistent recoverable storage. Each logged transaction is merged and processed using the restart information an entry point is stored for each of the multiple log files. Processing of the multiple log files may be restarted at the entry point for that log file. In certain implementations, a global, ascending, causally ordered commit timestamp of a last processed transaction is stored. In further implementations, a transaction for which the global, ascending, causally ordered timestamp is smaller than a stored global, ascending, causally ordered timestamp is not merged or processed.

The described implementations provide improved techniques to combine distributed database technology and data replication for improved database systems. In particular, multiple log entries in multiple log files may be used to form local transactions and then global transactions.

BRIEF DESCRIPTION OF THE DRAWINGS

Referring now to the drawings in which like reference numbers represent corresponding parts throughout:

FIGS. 4A, 4B, and 4C illustrate dissemination, data consolidation, and workload partitioning in accordance with certain implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

In certain implementations of the invention, both distributed database technology and data replication technology are combined to provide an improved data replication solution that works in a distributed database system. In certain implementations, DB2® DataPropagator (DPROPR®) and DB2® Enterprise Extended Edition (DB2® EEE®) from International Business Systems, Inc. (IBM) are combined. DPROPR® is IBM's solution for relational data replication, DB2® EEE®) is IBM's distributed database management system. The combination provided by implementations of the invention enables an enterprise's data to be available most of the time and nearly everywhere.

In certain implementations, DPROPR® is enhanced to enable data replication from DB2® EEE®. The design extends one component within DPROPR®, and this component will be referred to herein as a "Merging Independent Log Entries" (MILE) program. Although examples herein will be directed to DPROPR®, DB2® EEE®, and other IBM products, the techniques of the invention are applicable to other products from other sources.

Figure 1A:
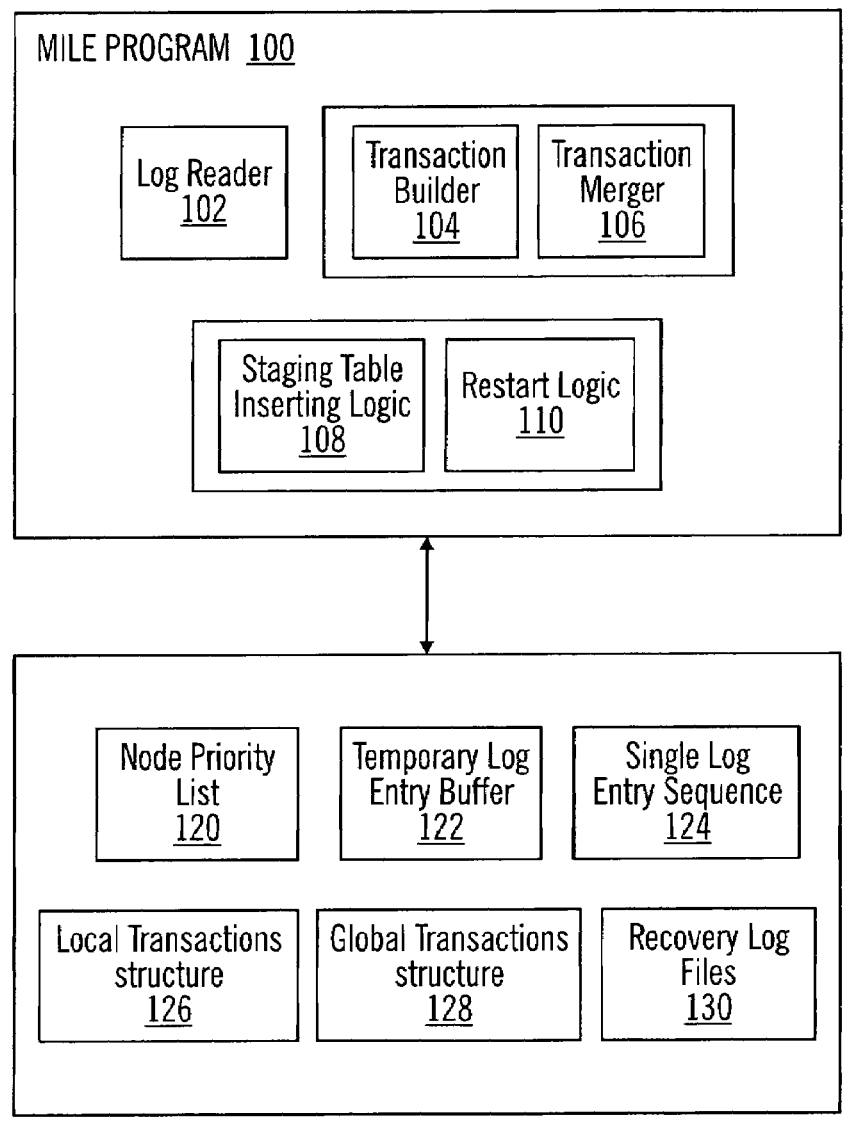
FIG. 1A illustrates a computing environment in which aspects of the invention are implemented in accordance with certain implementations of the invention.

FIG. 1A illustrates a computing environment in which aspects of the invention are implemented in accordance with certain implementations of the invention. In certain implementations, a Merging Independent Log Entries (MILE) program 100 is provided. The MILE program 100 includes the following components: a log reader 102, a transaction builder 104, a transaction merger 106, staging table inserting logic 108, and restart logic 110. In certain implementations, all components 102, 104, 106, 108, and 110 reside in the same program context, and they are able to communicate with each other. In certain implementations, components 104 and 106 are combined into one component. In certain implementations, components 108 and 110 are combined to form one component. In certain implementations, the components 102, 104, 106, 108, and 110 can be combined into a single thread within the MILE program. In certain implementations, for better performance, each component 102, 104, 106, 108 and 110 may be a separate thread, for example, when running on a symmetric multiprocessing (SMP) machine.

The log reader 102 retrieves data input of the MILE program 100. Each node in a distributed database system stores a recovery log, which is also referred to as a "database recovery log," (e.g., as a recovery log file) that describes the changes of all transactions that were performed at that node. For each one of the multiple nodes, the log reader 102 retrieves log entries (i.e., log records) from the node's recovery log files 103. The log reader 102 determines the order of reading the nodes using a node priority list 120. The output of the log reader 102 is a single log entry sequence 124, which contains log entries from all of the recovery log files 130. During processing, the log reader 102 stores log entries in a temporary log entry buffer 122.

The transaction builder 104 and transaction merger 106 contain log entry processing logic. From the single log entry sequence 124 output by the log reader 102, the transaction builder builds local transactions and stores them into a local transactions structure 126 for each node (i.e., there is one local transactions memory structure per node for which there are log entries). The transaction merger 106 creates a mapping from local to global transactions in a global transactions structure 128. In a cluster of nodes, two or more nodes may participate in a global transaction.

The staging table inserting logic 108 and restart logic 110 create the MILE program output and update the restart information. Since both actions happen at approximately the same time, in certain implementations, the staging table inserting logic and restart logic may be combined into one component.

Figure 1B:
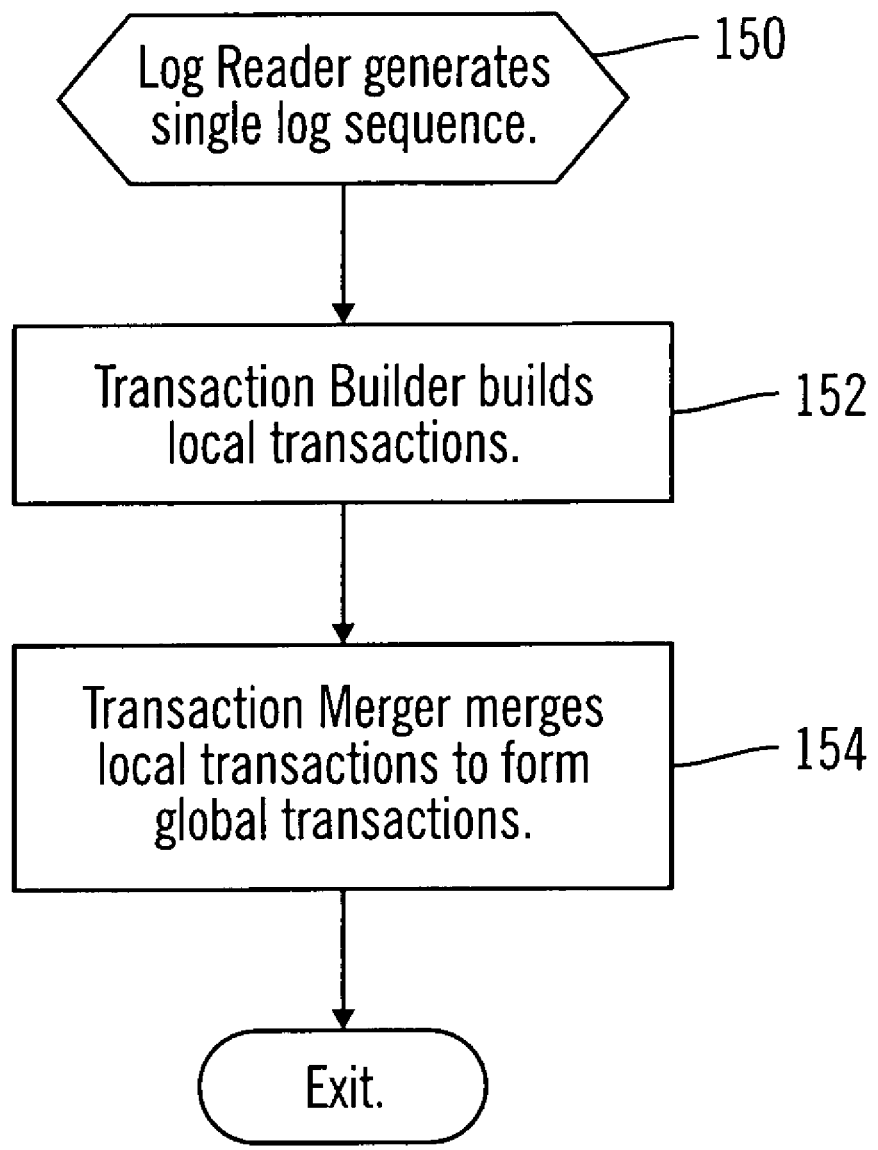
FIG. 1B illustrates logic implemented in the Merging Independent Log Entries (MILE) program in accordance with certain implementations of the invention.

FIG. 1B illustrates logic implemented in the MILE program in accordance with certain implementations of the invention. Control begins at block 150 with the log reader 102 generating a single log entry sequence 124. The transaction builder 104 generates local transactions from the single log entry sequence 124 and stores them in the local transactions structure 126 (block 152). In particular, log entries with the same local transaction identifier are concatenated to form a local transaction. The transaction merger 106 merges local transactions having the same global identifier to form global transactions. That is, relevant log entries are grouped first by being related to the same transaction from a same recovery log. Second, the grouped log entries are grouped by being related to the same global transaction.

1. Data Replication

For today's enterprises, data is the key to business. As companies automate their business practices and procedures, they collect and manage large volumes of data. This data often resides in more than one database. As separate organizations (e.g., an accounting department and a human resources department) within enterprises work together, they find that they would like to share certain data with each other. Data replication is a powerful means to achieve this goal. Moreover data replication enhances data availability and system performance.

Figure 2:
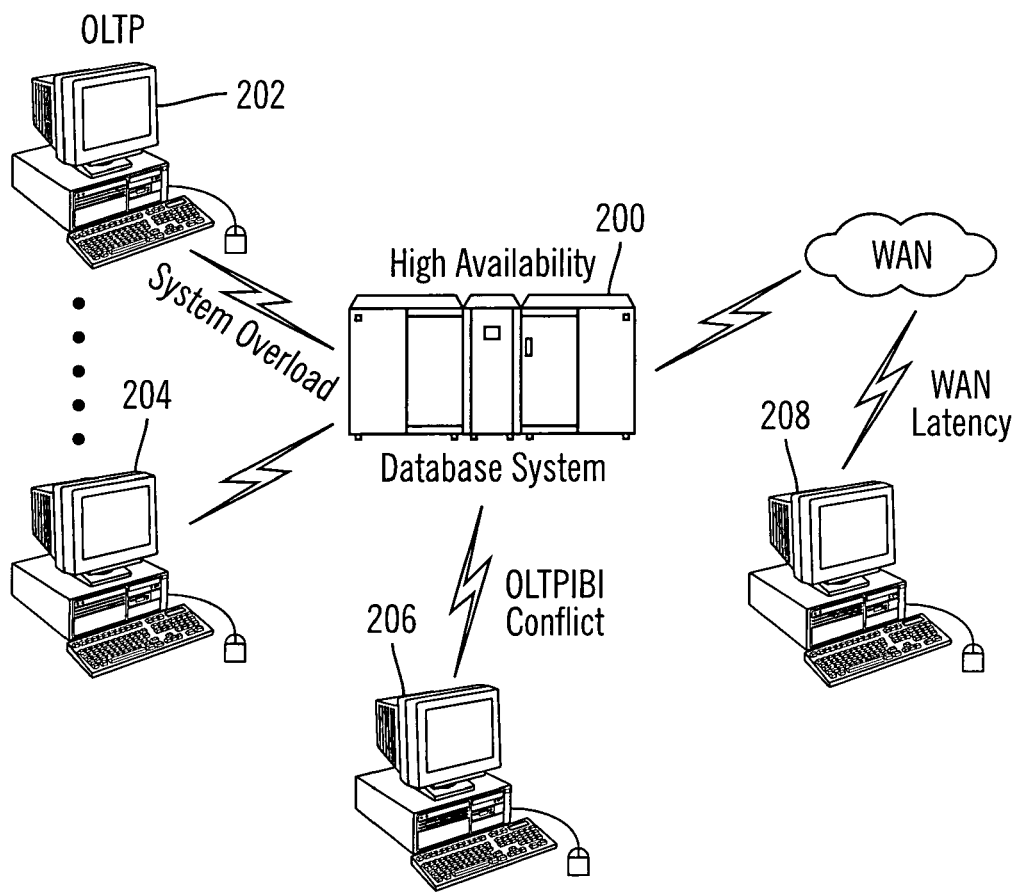
FIG. 2 illustrates in a block diagram a computer network in accordance with certain implementations of the invention that do not use data replication.

FIG. 2 illustrates in a block diagram a computer network in accordance with certain implementations of the invention that do not use data replication. In FIG. 2, a single database system 200 is accessed by multiple client computers 202, 204, 206, and 208 simultaneously. This simultaneous access of one set of data at the database system 200 leads to system overload, Online Transaction Processing/Business Intelligence (OLTP/BI) conflict, and WAN latency.

Data replication is the process of maintaining multiple copies of specified data sets (i.e., replicated data). In the replication process, data changes are captured from a data source and then applied to one or more data targets. Instead of working directly on the data source, applications can then work on the replicas instead. Some benefits of data replication technology include:

(1) Increased data availability—in case the main system goes offline, the local replicas are still available.
(2) Increased application performance—by eliminating network latency (WAN), response time decreases, thus resulting in higher application performance.
(3) Offloading of queries from the main system—the main system is only loaded while replicating the data to the target, all other queries happen locally on the replicas.
(4) Availability of warm standby backups—a replica can act as a backup copy for the case of a total data loss in the main system.
(5) Integrated data from different locations—data can get replicated from several sources into a single target.

For further information on the benefits of data replication, see Lindsay, Bruce, "Data Where You Want It, When You Need It", DB2® and Business Intelligence Technical Conference, Florida, Oct. 1–5, 2001, which is incorporated by reference herein in its entirety.

Figure 3:
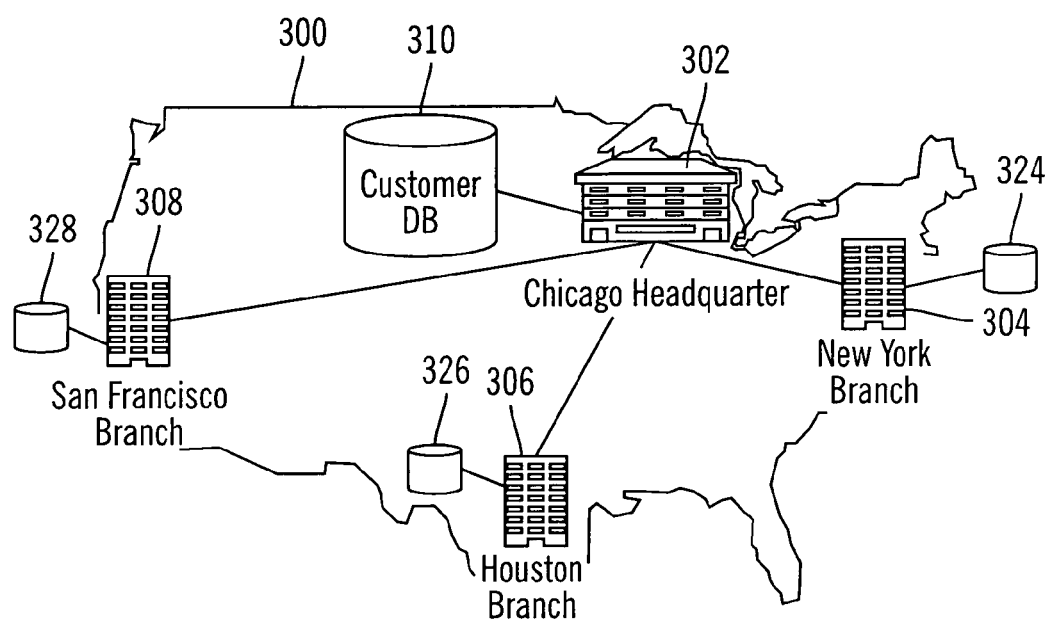
FIG. 3 illustrates an example scenario for data replication in accordance with certain implementations of the invention.

Data replication is more complex than simply copying data from location A to location B. The maintenance and administration of replicated data is fairly complex and needs many resources. FIG. 3 illustrates an example scenario for data replication in accordance with certain implementations of the invention. In particular, FIG. 3 illustrates a map 300 with several locations of an enterprise. The headquarters is located in Chicago 302, which is responsible for maintaining all customer information in the customer database. The other branches, which are located in New York 304, Houston 306, and San Francisco 308, need to access the customer database 310. Each branch 304, 306, and 308 is connected to the headquarters 302 through a WAN connection. The branches 304, 306, and 308 do not need to update the customer database 310, a read access is sufficient. The branches 304, 306, and 308 operate on copies (i.e., replicas) 324, 326, and 328 of the customer database 310, which are synchronized with the data in the customer database 310 at headquarters 302 periodically, (e.g., once a day).

In the example illustrated in FIG. 3, replication increases the overall system performance and the data availability. The performance increase is achieved by off loading the headquarter's 302 database system. In particular, accessing the local replicas 324, 326, and 328 at the branches 304, 306, and 308, respectively, is faster and offloads the headquarter's database system. Data availability is also enhanced, since the headquarter's 302 customer database 310 can be disconnected and the branches 304, 306, and 308 are still able to query their replicas 324, 326, and 328. Whenever the headquarters 302 goes online again, new changes to the customer database 310 get replicated to the replicas 324, 326, and 328 at the branches 304, 306, and 308. In certain implementations, to keep the data amount to a minimum, only the changed data records since the last synchronization process get replicated from the headquarters 302 to the branches 304, 306, and 308. In certain implementations, a defined subset of the customer database 310 gets replicated to the replicas 324, 326, and 328 at the branches 304, 306, and 308.

Data replication includes data dissemination and consolidation, which are illustrated in FIGS. 4A and 4B in accordance with certain implementations of the invention. Data dissemination distributes data from one source 400 with read/write capability (i.e., data may be read from or written to the database) to multiple targets 402 and 404 having read capability (i.e., data may be read from the databases). Data consolidation integrates data from several sources 410 and 412 into one target 414. FIG. 4C illustrates workload partitioning in accordance with certain implementations of the invention. With workload partitioning, each peer 420 and 422 has source data with read/write capability 430 and 442 and target data with read capability 432 and 440

Data replication can be either synchronous or asynchronous. Synchronous, or real time, replication replicates changes from a source to a target at the time the source is updated. With synchronous data replication, the target is an exact copy of the data source at a given time. Synchronous data replication typically uses a two-phase commit protocol, which will be described in further detail below, to protect the data's integrity between the source and the target. While synchronous data replication keeps an exact real time copy of the data source, synchronous data replication does so at the expense of possible loss of availability and performance.

Asynchronous, or non-real time, replication replicates changes to the target in a different transaction scope than the originating transaction. This means there is a time interval lag involved, which can range from a sub-second to hours, depending on the implementation and performance factors. The interval depends on the enterprise's needs and whether the enterprise chooses data dissemination or consolidation. For example, the interval may depend on how up-to-date the data in the replicas needs to be. In implementations discussed herein, the asynchronous replication type will be used for illustration. IBM's DataPropagator is an asynchronous replication solution.

Figure 5:
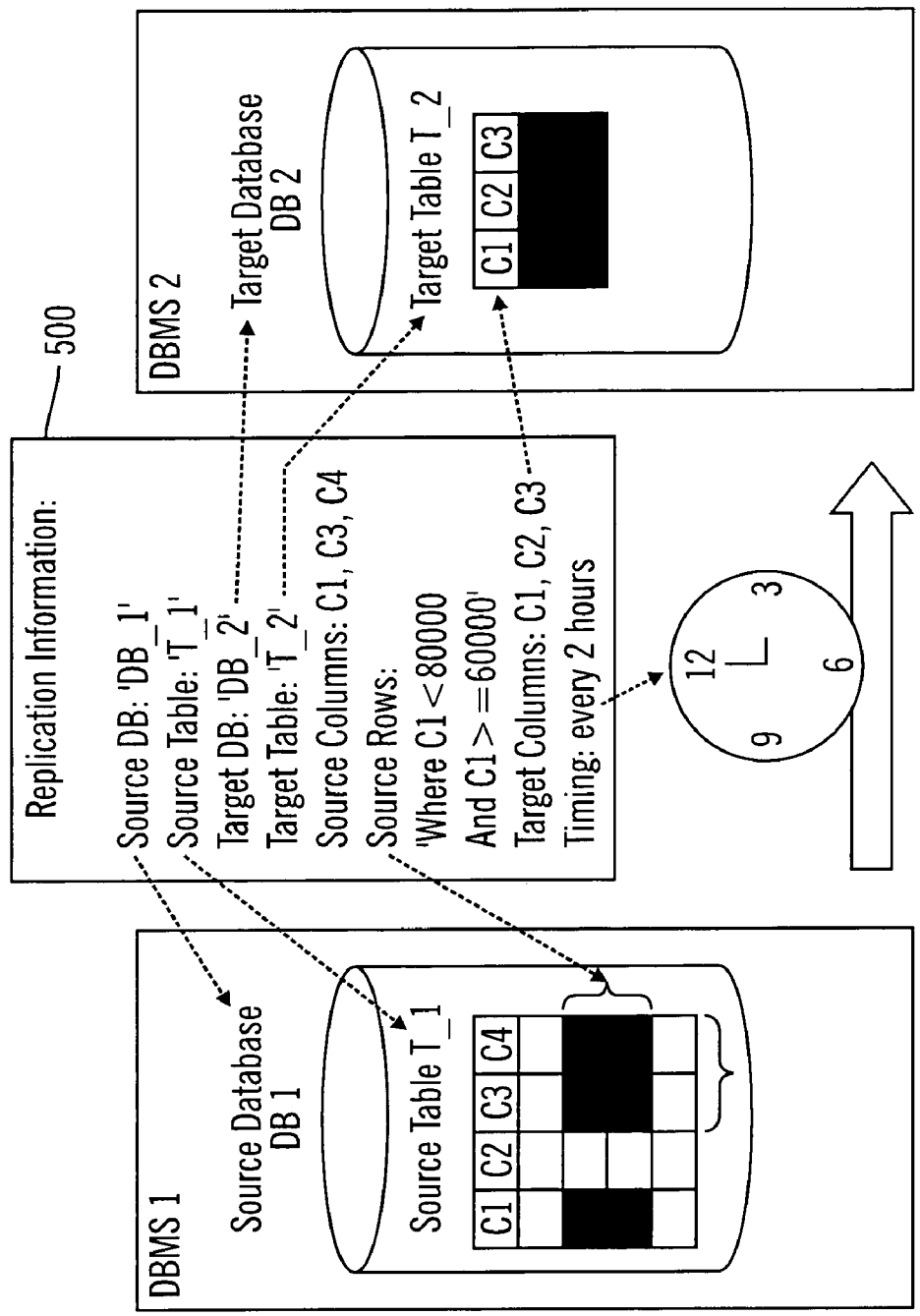
FIG. 5 illustrates replication information used to perform asynchronous data replication in accordance with certain implementations of the invention.

Units of asynchronous data replication are not always whole databases or whole tables. It is possible to replicate a subset of the data source (i.e., a subset of columns, a subset of rows, or both). The definition of the subset may be compared to a SQL Select clause. FIG. 5 illustrates replication information 500 used to perform asynchronous data replication in accordance with certain implementations of the invention. The replication information 500 includes identification of a source database, one or more source tables, one or more columns and/or rows of the source tables, one or more target databases, one or more target tables, and an interval for the synchronization process. This information generates a mapping from the source to the one or more targets.

2 Distributed Database Systems

A distributed database system (DDBS) is a collection of data items stored on multiple computer systems that are interconnected by a network. The computer systems commonly are referred to as nodes or sites and are failure-independent systems. The term site is often used to emphasize the physical distribution for the distributed database system. The nodes can be geographically distributed or located at one physical site and connected by a local area network (LAN). The DDBS distributes a data set (i.e., a database) across the nodes, and the distribution is transparent to users and applications.

Applications submitted by users to a DDBS request actions to be performed in the form of one or more transactions. For recovery (i.e., to apply transactions again that may have been lost, for example, due to a disaster) and rollback (i.e., undoing transactions) purposes, transactions are recorded by the DDBS into a node's recovery log file.

Due to the data distribution over several sites, there exist two types of transactions: local and global. A local transaction updates data on the node on which the local transaction was initiated, and this node is referred to as an originating or coordinator node. A global transaction, in contrast, accesses and updates data on multiple nodes or on a node different from the coordinator node, which is referred to as a participant or subordinate node.

A distributed database system (DDBS) stores data on a series of computers that are interconnected by a communication network. Each computer system stores a data repository, such as a relational database. The DDBS acts as a main layer that integrates the repositories from all systems into a single, logical entity. The fact that the data consists of several partitions is transparent to users and applications.

Similar to a non-distributed database management system (DBMS), a distributed DBMS achieves data integration by storing and managing data in one place. The integration happens on a logical level. On a physical level the data is distributed across a group of sites. The distribution not only includes data, but also DBMS functionality. The four basic properties of a transaction, also referred to as ACID properties, are:

(1) atomicity—the entire transaction is performed or none of the transaction is performed (i.e., an 'all or nothing' property) and a transaction is an indivisible unit;
(2) consistency—transactions transform the database from one consistent state to another consistent state;
(3) independence—transactions execute independently of one another; and
(4) durability (or persistence)—the effects of a successfully committed transaction are permanently recorded in the database and can not be undone, or lost due to failures of for example, processors, storage, or communication.

It is the task of a transaction manager to manage the execution of transactions and to coordinate database requests on behalf of a transaction. A scheduler implements a strategy for the transaction execution order. In order to ensure data atomicity and durability, the transaction manager in a DDBS typically uses a distributed commit protocol, such as a two-phase commit protocol. Use of a distributed commit protocol ensures the atomicity of the transaction and ensures that all participating nodes in a distributed database environment remain in a consistent state.

Figure 6:
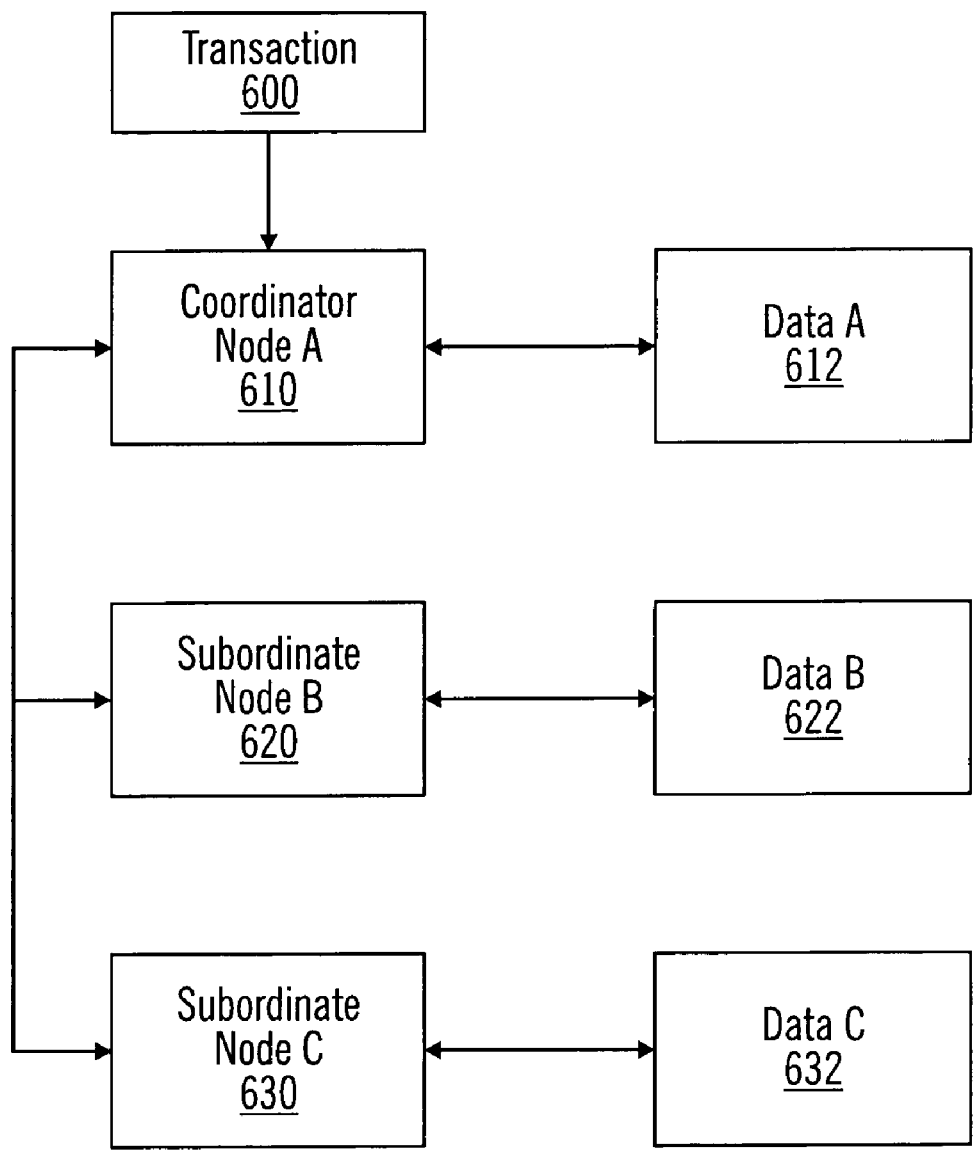
FIG. 6 illustrates a two-phase commit in accordance with certain implementations of the invention.

FIG. 6 illustrates a two-phase commit in accordance with certain implementations of the invention. Nodes 610, 620, and 630 are connected via, for example, a network and are able to communicate with each other. Each node 610, 620, and 630 is able to a access data 612, data B 622, and data C 632, respectively. A transaction 600 may require access (e.g., for reading and/or updating) to data A 612, data B 622, and data C 632. The transaction 600 is submitted to a coordinator node A 610, which forwards requests for access to data in data B 622 and data C 632 for the transaction to subordinate nodes B 620 and C 630, respectively. When coordinator node A 610 receives a Commit from transaction 600 indicating that changes made by the transaction should be committed to data 612, data B 622, and data C 632, coordinator node A 610 notifies subordinate nodes B 620 and C 630 that it is preparing to commit. Subordinate nodes B 620 and C 630 record subordinate Prepare to Commit log entries, prepare to commit, and respond to coordinator node A 610. Then, coordinator node A 610 commits changes made by transaction 600, records a coordinator Commit log entry, and notifies subordinate nodes B 620 and C 630 that it has committed. Subordinate nodes B 620 and C 630 commit. Note that log entries are identified by "kind" that indicates the type of the log entry. For example, a log entry may be a coordinator Commit kind or a subordinate Prepare to Commit kind.

A distributed database management system (DDBMS) manages the following tasks: data distribution, concurrency control, load balancing, and failure recovery. The data distribution is transparent to users and applications, and a distributed database appears as one logical unit. This ensures compatibility, since the applications do not have to be aware of the data distribution. The goal of concurrency control is to ensure that individual users see a consistent database, although the DDBMS has incorporated updates from many users.

Just as a traditional DBMS hides facts from users and applications about the internal management of a database, a DDBMS also distributes the data within the system in a transparent manner. Instead of showing the data distribution, the DDBMS presents a logical entity of a database. Applications and end-users do not need to be aware of the data distribution and therefore do not need additional changes to work with the DDBMS. One technique for distributing data divides a database into several database fragments according to some criteria (e.g., horizontal, vertical, or hybrid fragmentation) and distributes these fragments across the system. Distributing the data provides improved performance.

One technique for increasing the processing speed of transactions is to exploit the power of parallel and distributed computing. For example, symmetric multiprocessing (SMP) machines that break up complex tasks into several smaller tasks and execute them in parallel provide improved performance. This is achieved by the SMP architecture, which provides several separate processors within the SMP machine that allow this parallelism.

Some DBMSs today support parallelism, but only within the SMP architecture. Typically, many disk operations are performed, but the processors share one common bus to the hard disc. Thus, accesses to the hard disc have to be serialized and the real parallelism is gone.

On the other hand, a DDBMS achieves real parallelism across a system of several computers, where each machine is autonomous to a certain extent. The main demands to such a DDBMS are: high performance (throughput, transactions per second), high availability (nearly zero downtime), good scalability, transparency of data distribution, and high failure tolerance.

A DDBMS is useful for many enterprises, which have the need to integrate information from different data sources. Additionally, a DDBMS provides a higher processing speed over larger data sets. That is, whenever too many users access the database system at once or the amount of data gets too big to be handled efficiently by a DBMS, a DDBMS is used.

Figure 7:
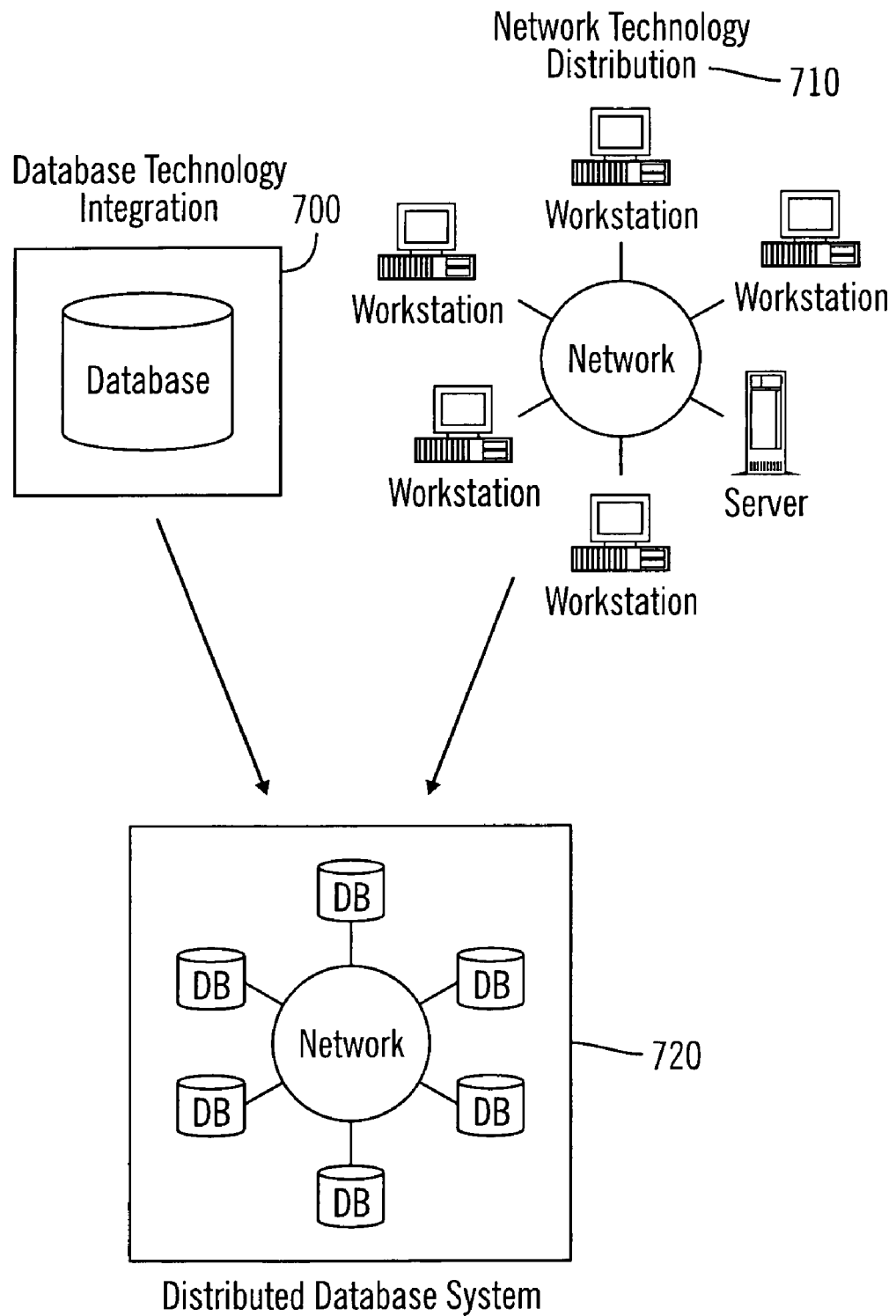
FIG. 7 illustrates that a DDBMS is a synthesis of two technologies for processing data in accordance with certain implementations of the invention.

FIG. 7 illustrates that a DDBMS is a synthesis of two technologies for processing data in accordance with certain implementations of the invention. One technology is the database technology 700, and the other is computer network technology 710. Database technology 700 allows enterprises to move away from using traditional file processing systems where each application stored its own set of data. A database system provides means to manage data for more than just one application. A database system also ensures data integrity and transparency (i.e. end-users and applications do not know and do not need to know how data is organized within the database system). Because users and applications do not need to know how the data is organized, they are immune to logical or physical changes within the database system. Users and applications need only know the common interface that provides access to the data.

Computer network technology 710 enables distribution of either processing logic, functions or data across a network of several computer systems. Computer network technology 720 provides means to interconnect several computer systems that may be geographically apart, but still acting as one whole logical system.

The database technology 700 stores and manages a set of data in one place, a kind of centralization. On the other hand, the computer network technology 720 is used to distribute resources. Because a goal of database technology is integration of data, rather than the centralization of data, and since integration may be achieved without centralization, database technology 700 works well with computer network technology 710. The combination leads to a distributed database system 720.

The DB2® Enterprise Extended Edition (DB2® EEE®) provides increased processing power. DB2® EEE® is a complete homogeneous distributed database system. That is, all databases are from the same logical structure and run on one operating system.

Whenever an enterprise grows, the enterprise faces more and more users accessing the enterprise's database system and the amount of data in the database system grows. In the long run, the enterprise requires a high performance database system that is able to handle a large amount of data with authority and that keeps the response time to user requests low.

The motivation for combining database and computer network technologies came both from the user side and the technology side. From the technology side, there were high performance computers and reliable data communication facilities, which made distributed computing highly available and less expensive than it was a decade ago. So on one side more and more users and applications demand a higher performance from the database system and the other side we have technology progress that supports the demand.

Table fragmentation may occur in distributed databases. Table fragmentation refers to a splitting of a single table in some form. Existing table fragment techniques are vertical table fragmentation, horizontal table fragmentation, and a combination of both vertical and horizontal table fragmentation techniques, which is referred to as hybrid fragmentation. DB2® EEE® uses horizontal table fragmentation to divide tables.

Horizontal fragmentation implies the division of relations, i.e. tables, along tuples. This technique can be understood as a SELECT statement on the table, where the WHERE clause determines which tuples go into which table fragment. The vertical table fragmentation technique divides a table by splitting between the table's attributes, i.e. columns. Again, the fragmentation is a SELECT clause, where this time the SELECT clause determines which attributes, i.e. columns, go into which table fragments. The hybrid table fragmentation technique is a combination of both vertical and horizontal fragmentation. For example, a table may be divided vertically, and then one of the vertical table fragments may be divided horizontally.

Figure 8:
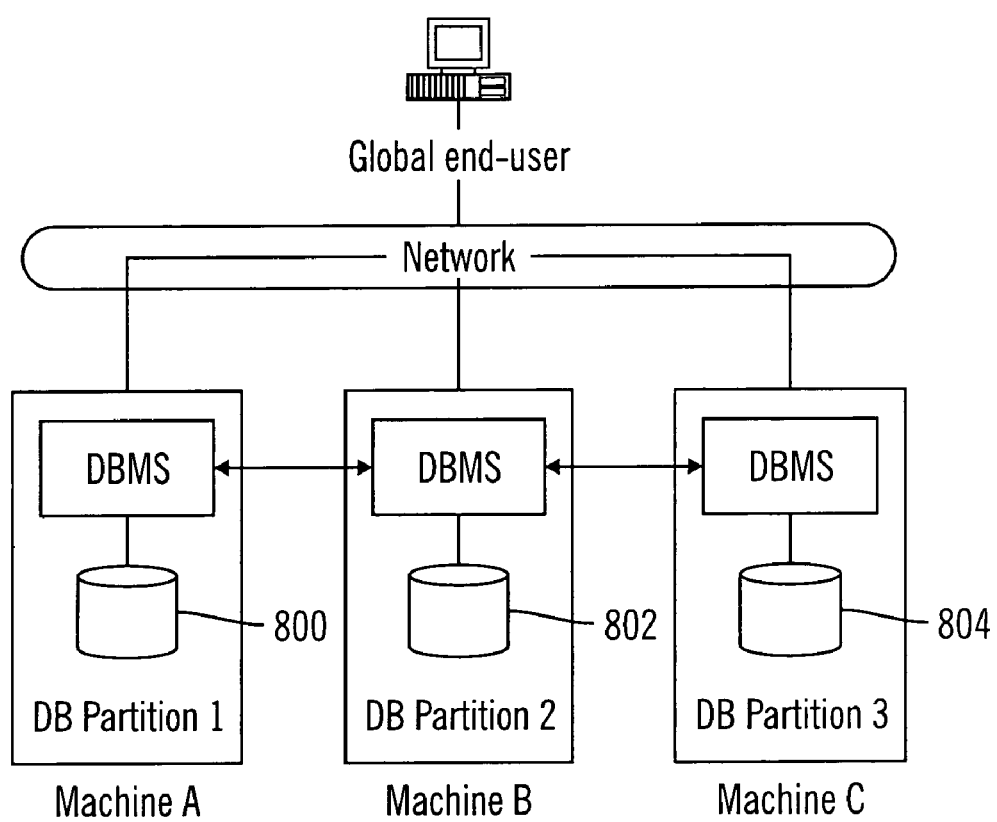
FIG. 8 illustrates data partitioning in a DDBMS in accordance with certain implementations of the invention.

Database technology and computer network technology may be combined in numerous ways. For example, there are distributed database systems and federated database systems. In a (homogeneous) distributed database system, a database is fragmented (e.g., horizontal, vertical, or hybrid table fragmentation) into several partitions and is distributed across several machines that are interconnected by a network. FIG. 8 illustrates data partitioning in a DDBMS in accordance with certain implementations of the invention. For example, data may be stored in partition 1 800, partition 2 802, or partition 3 804.

The database manager partitions the data, relocates the data within the system, performs query optimization, and more. All this happens transparently to end users and applications, for whom the database appears as a single, logical database. Transparency has the advantage that an end-user or an application does not have to be aware of the fact that the database is distributed across multiple computer systems. A federated database system is a special case of a multi-database system. Certain implementations of the invention are directed to distributed database systems, but the techniques of the invention are applicable to federated database systems.

3. DB2® DataPropagator

Figure 9:
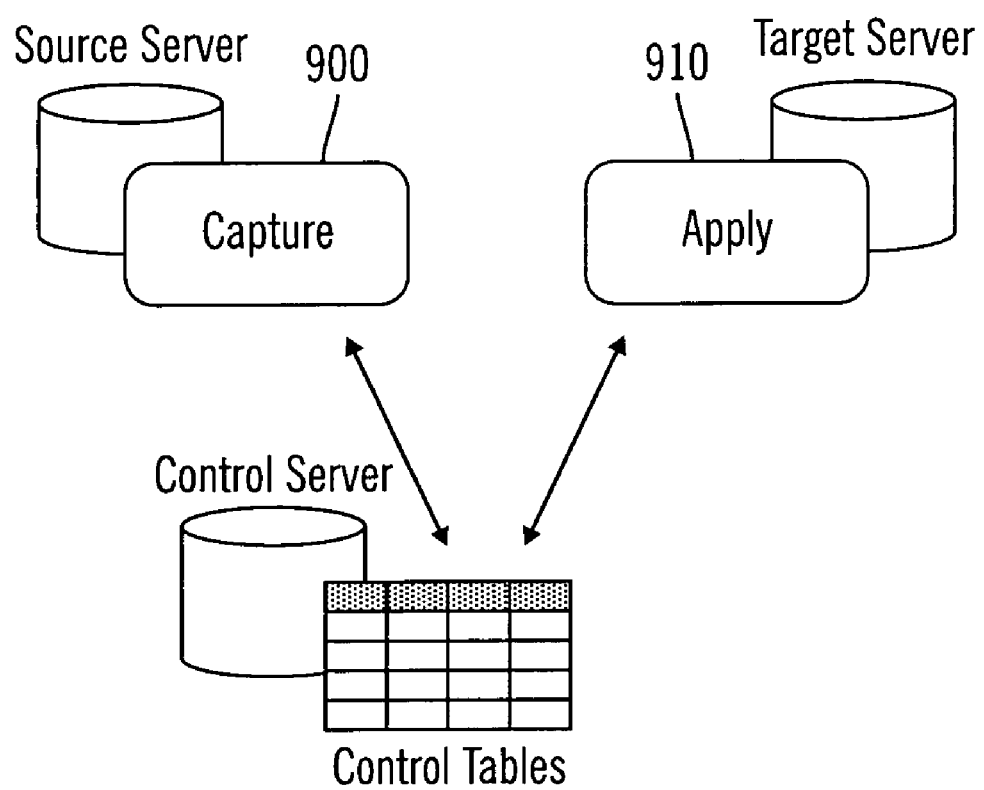
FIG. 9 illustrates components of DPROPR® in accordance with certain implementations of the invention.

The DB2® DataPropagator (DPROPR®) is IBM's solution for asynchronous replication tasks. DPROPR® enables asynchronous data replication from DB2® sources to DB2® targets, and non-IBM sources and targets. FIG. 9 illustrates components of DPROPR® in accordance with certain implementations of the invention. DPROPR® consists of several components, including a Capture program 900, an Apply program 910, and a control center. The Capture program 900 captures data changes at the data source. The Apply program 910 reads the data changes from the Capture program 900 and applies them to the data target. The control center is the main GUI that helps the user to configure replication tasks by defining the data source, target and many more parameters.

DPROPR® replicates data asynchronously from and to relational databases. This task is divided into capturing the data changes from the source database (i.e., with the Capture program 900) and applying the data changes to the target database (i.e., with Apply). In certain implementations, The Capture program 900 and Apply are separate computer programs. The Capture program 900 runs against the source database and processes the source database's recovery log file. The recovery log file is the database's activity protocol. Each change to data records, i.e. updates, inserts, and deletes are recorded in the recovery log file. From the contents of the recovery log file, the Capture program 900 deduces changes that occurred at the data source and stores them into staging tables. The Apply program 910 runs against one or more data targets. The Apply program 910 reads the data changes that have been captured by the Capture program 900 and applies them to the data target.

The Capture program 900 is a log based replication solution (i.e., the Capture program 900 scans the recovery log file of a database for data changes). The Capture program 900 scans the recovery log file of a database sequentially and examines each recovery log file entry, i.e. a log entry. A log entry is a data structure that describes the action that was performed on an object within the database. In DB2®, a log entry consists of one common log entry header and a record. The common log entry header, which is referred to as a Log Manager Log Record Header, contains information detailing the log entry and transaction information, such as a unique transaction identifier (TID). The transaction identifier allows the log entries relating to the same transaction to be identified uniquely within the recovery log file for a non-distributed DBMS. All log entries written by a single transaction contain the same transaction identifier. The transaction identifier ties together all log entries that belong to one single transaction. The end of a transaction is signaled with a Commit or Abort log entry, but the beginning of a transaction does not necessarily write a specific log entry, such as Begin.

In a DB2® recovery log file, each log entry is uniquely addressed by a log sequence number (LSN), which is a relative byte address for the first byte of the log entry. Since the log file of a database and its log entries provide information about database activity that happened in the past, complete transactions may be extracted from the log file. In particular, the Capture program 900 extracts transactions by scanning the recovery log file of a database for specific log entries (e.g., log entries that belong to tables that are registered as replication sources within the database) and extracts essential information from the recovery log file. Internally, the Capture program 900 builds a transaction in memory, until the Capture program 900 sees a Commit log entry for this transaction. The Capture program 900 does not necessarily commit the transaction immediately to the staging table. The commitment to the staging table happens after a specified interval has elapsed, and this interval is referred to as a commit interval. Records describing the changes of each transaction within the memory of the Capture program 900 are inserted into the staging table, which supplies data to the Apply program 910.

A database's recovery log file contains actions recorded by the data manager (including a Long Field) by a LOB and Datalink manager, and by a transaction manager. The data manager protocols handle data changes on rows (e.g., updates, inserts, and deletes). The transaction manager coordinates transactions.

The term warm start refers to the restart of a program, such as the Capture program 900, with the "warm start" option. The warm start option allows the Capture program 900 to begin where the Capture program 900 had stopped at its last termination. Thus, instead of reading the source recovery log file from the beginning, the Capture program 900 continues reading the recovery log file from a previously saved position. In particular, during a warm start the Capture program 900 continues reading the log file from a certain position, which has been stored during the last run of the Capture program 900.

Figure 10:
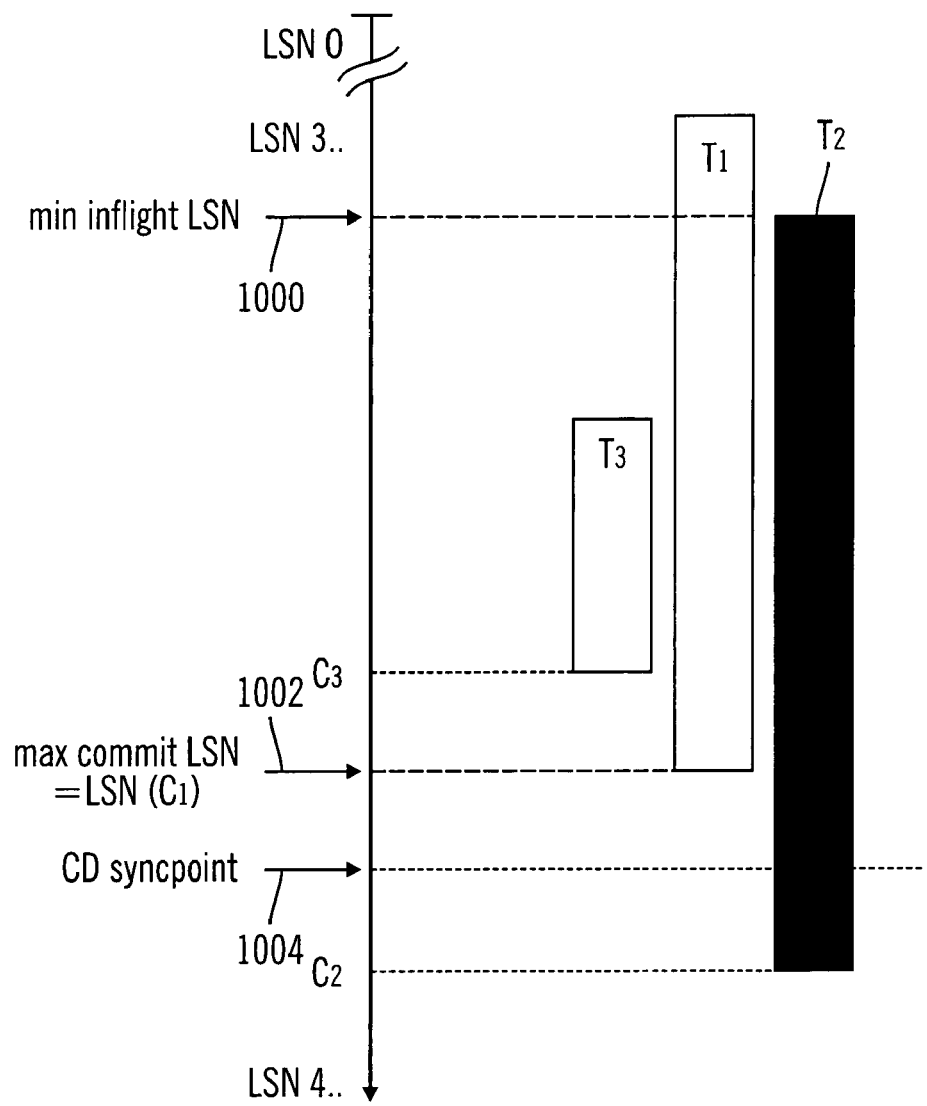
FIG. 10 illustrates data used during a warm start in accordance with certain implementations of the invention.

FIG. 10 illustrates data used during a warm start in accordance with certain implementations of the invention. When a transaction is performing some processing, the transactions is said to be "inflight." When a commit or abort operation is received for a transaction, the transaction is committed or aborted, respectively, and is no longer inflight. In FIG. 10, there are three transactions, labeled T1, T2, and T3. The commit operation for transaction T1 occurs at C1; the commit operation for transaction T2 occurs at C2, and the commit operation for transaction T3 occurs at C3. When a change data (CD) synch point 1004 is reached, transactions T1 and T3 have committed, and transaction T2 is in flight. Thus, at the CD synch point 1004, the inflight LSN (i.e., the beginning of transaction T2) is stored. Then, if a warm start is required after the CD synch point, a program recognizes that it should start reading log entries for transaction T2 at the inflight LSN. Additionally, at the CD synch point 1004, a max commit LSN 1002 is stored. The max commit LSN is the LSN of the commit operation of the last transaction that has been processed into staging tables. In this example, the max commit LSN is C1. In certain implementations, a CD synch point is reached after each commit is processed.

Thus, the entry point (i.e., "starting point" or "restart point") for the Capture program 900 is stored in a specific LSN value labeled as "min inflight LSN" 1000. An entry point is an address that is recorded within a memory structure, such as a table and specifies an earliest reported log entry for a transaction that has not completed due to some failure (e.g., system failure) or planned termination of the Capture program 900.

The term "cold start" refers to a situation in which the Capture program 900 starts "from scratch." All replicas are re-initialized and the Capture program 900 reads the recovery log file of the database from the current end of the log.

DB2® provides a log read application programming interface (API) to retrieve log entries from a recovery log file. The log read API returns log entries for tables that have been created with the 'data capture' changes attribute. By calling the log read API, the Capture program 900 retrieves log entries that are relevant for data replication. In this manner, overhead is minimized.

Restart is a feature within the Capture program 900 that ensures that replication of changes can be resumed after a restart. The restart of the Capture program 900 refers to a situation in which the Capture program 900 has been manually stopped by the user or stopped without warning due to, for example, a hardware or software failure. A warm start is performed the next time the Capture program 900 starts up. For a restart, two LSNs are stored. One LSN is the entry point for a restart. This LSN ensures that the Capture program 900 does not miss any log entries. The second LSN, named MAX_COMMIT_LSN, ensures that the Capture program 900 does not capture log entries from a single transaction more than once.

4. DB2® Enterprise Extended Edition

The DB2® Enterprise Extended Edition (DB2® EEE®) is a distributed database system product. DB2® EEE® provides the ability to distribute relational databases across multiple nodes. Every node runs on the same operating system. Also, in the DB2® EEE® context the term data partitioning refers to data distribution. The partitioning is transparent to end users and applications. Thus, end users and applications work on a partitioned DB2® EEE® database as if the partitioned DB2®) EEE® database were a single logical entity. The data distribution is also fully managed by the DB2® EEE® DBMS. DB2® EEE® uses the primary key of a table's tuple. In certain implementations, a user has no influence on how a table's data gets distributed. The participating nodes for a DB2® EEE database are defined by an administrator.

DB2® EEE® uses a shared-nothing hardware architecture. This architecture is a version of DB2® that supports the distribution of a single database over several machines that are interconnected through a high speed network. DB2® EEE® belongs to the family of homogenous distributed database systems. DB2®) EEE performs a horizontal partitioning on data tables. The distribution of the data rows over the nodes is determined by a hash function, which uses the partitioning key of a table as an argument of the hash function.

The recovery log file structure on each node is the same as in a non-partitioned DB2® database. The DB2® EEE® system uses a derivative of the two-phase commit protocol (2PC), which is the presumed commit protocol (PrC). PrC has been discussed in "An Argument in Favor of the Presumed Commit Protocol," Yousef J. Al-Houmaily, et al., University of Pittsburgh, which is incorporated by reference herein in its entirety. For the partial ordering of the events by the distributed computing system used by DB2®t EEE®, the DB2® EEE®) transaction manager uses a Lamport clock technique for the timestamp generation. The Lamport clock technique is described in "Time, Clocks, and the Ordering of Events in a Distributed System," by Leslie Lamport, Communications of the ACM, Volume 21 Number 7, July 1978, which is incorporated by reference herein in its entirety. The timestamp generation results in a causally ordered, ascending timestamp.

5. Merging Independent Log Entries (MILE) Program

In certain implementations, a MILE program is provided to enable DPROPR® and DB2® EEE® to work together. The MILE program works with a partitioned source database (rather than a non-partitioned source database). Thus, there are multiple physical database partitions and recovery log files. The MILE program is a log based, asynchronous replication solution that performs asynchronous data replication tasks at the data source, i.e. capturing the data changes from a DB2® EEE® source database and storing them externally for use by, for example, Apply program 910.

Figure 11:
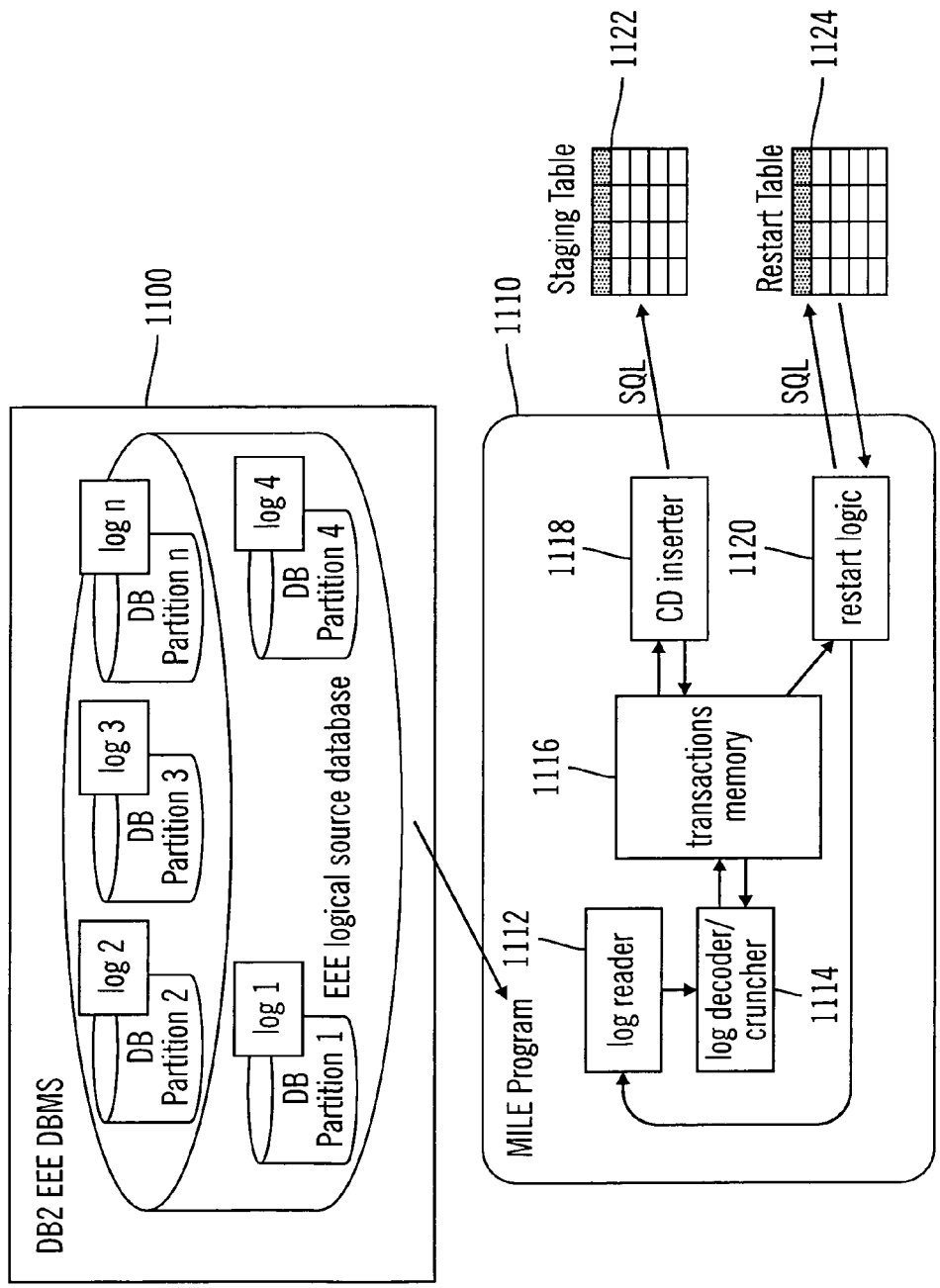
FIG. 11 illustrates the MILE program with a partitioned DB2® EEE® source in accordance with certain implementations of the invention.

FIG. 11 illustrates the MILE program with a partitioned DB2® EEE® source in accordance with certain implementations of the invention. A DB2® EEE® DBMS 1100 includes multiple partitions, each with a recovery log file. The MILE program 1110 includes several components. A log reader 1112 reads log entries from recovery log files. In a single pass through the logs, the log reader 1112 identifies log entries that are relevant to processing by the MILE program 1110 (e.g., log entries related to a two-phase commit protocol). Identified and relevant log entries are grouped first by being related to the same transaction from a same recovery log. Second, the grouped log entries are grouped by being related to the same global transaction. The log decoder/cruncher 1114 stores the identified log entries into transactions memory 1116. Subsequently, CD inserter 1118 reviews the doubly grouped log entries in transactions memory 1116, parses the data in the entries, and inserts the data into the staging tables 1122 for eventual use by the apply program. Alternatively, certain implementations may parse and copy log entries into one or more persistent queues, such as those provided by IBM's MQ Series product. Restart logic 1120 stores data for restarting (e.g., for a warm start) in restart table 1124. Restart table 1124 may include, for example, inflight LSNs. In certain implementations, each time that the changes stored into staging tables or onto persistent queues are to be committed, the restart logic 1120 of the MILE program 1110 first stores into a table or queue information for starting the log reader at each partition. The changed data (CD) inserter 1118 inserts data parsed by the decoder/cruncher 1114 from the log entries into a staging table 1122 from transactions memory 1116.

The restart logic 1124 keeps one LSN per node as the entry point for the MILE program. This LSN may be referred to as "MININFLIGHT_LSN." Additionally, in certain implementations, the max commit LSN 1002 (FIG. 10) has been replaced by a global timestamp of the last transaction processed by the CD inserter 1118. The global timestamp prevents the MILE program from capturing a transaction twice.

The multiple recovery log files are accessed and read by the MILE program. The MILE program merges the log entries from each node to local transactions, respecting the log entries' local order. The local transactions are merged to global transactions, and the MILE program determines a correct order of the global transactions. The restart logic is enhanced for multiple recovery log files. In particular, the restart table stores restart points for multiple recovery log files on multiple nodes. Also, the end-of-log (EOL) case is properly managed while reading the recovery log files. When the end-of-log has been reached, there is no sequentially next log entry.

DPROPR® uses an asynchronous log read API (e.g., DB2®API) to retrieve log entries from a node. For further information, see IBM DB2® Universal Database, "Administrative API Reference V7", Document Number SC09-2947-00, 2000, which is incorporated by reference herein in its entirety. The prerequisite for the log read API usage is an active connection to the node. If the connection call is made without specifying a node, DB2® EEE® chooses a node by default. This node can be different with every connection call. To determine which node the MILE program wants to connect to, the MILE program sets either an environment variable or an internal API value, which is an API parameter.

In order to process the node's log entries, the MILE program determines which nodes belong to the source database, establishes a connection to each node, and retrieves a node's recovery log file contents through the log read API. Since DB2® EE® keeps a database's partitioning transparent, the source database appears as a single logical entity.

The MILE program determines which nodes belong to the partitioned DB2® EEE(database. The identity of the nodes is used to make a connection to the specific node. The determination of the participating nodes takes place on a physical level. After the identifiers of the participating nodes are retrieved, the MILE program establishes a database connection to each node. The connection to a node is the prerequisite for the use of an asynchronous read log (arl) interface. The asynchronous read log interface is then used for retrieving the log entries from a node. The MILE program then processes the contents of the log entries in order to build transactions.

The access of multiple recovery log files may be performed with access and scan one recovery log file at a time (i.e., a "single log reader approach") or with access and scan of all recovery log files simultaneously (i.e., a "multiple log reader approach"). The first alternative, the single log reader approach, is beneficial when there is an extremely large number of nodes, and thus recovery log files in the system. The second alternative, the multiple log reader approach, is beneficial if executed on an SMP machine with many resources, since the multiple log reader approach requires one separate thread for each node. The multiple log reader approach requires additional synchronization effort on the simultaneously accessed recovery log files. Although the multiple log reader approach promises a higher performance on the MILE program input processing, the multiple log reader approach does so for a more complex design and implementation. Thus, in certain implementations, the single log reader approach is applied. The techniques of the invention may be extended to the multiple log reader approach, and, in certain implementations, the multiple log reader approach is applied.

The output of the single log reader approach is a single, logical log that is generated from multiple physical logs. The MILE program stores the logical log entries internally in memory. The logical log is processed to extract the transactions. Since the single log reader approach accesses and scans one recovery log file at a time, the single log reader approach controls the concurrency of log accesses. The single log reader approach determines the recovery log file that will be scanned next and the point at which the scanning of the determined recovery log file will stop.

With the single log reader approach, log entries have unique log sequence numbers (LSNs) and timestamps that are unique and always ascending. The single log reader approach generates a logical log from multiple physical logs by catenating log entries from different recovery log files at different nodes. The LSNs of the log entries are extended to render them unique across nodes, by, for example catenating a log entry's LSN with its corresponding node identifier. A node identifier is unique across nodes. By this LSN extension, a log entry is uniquely addressable in the logical log.

Throughout the log entry sequence, the timestamps appearing in selected ones of the log entries are ascending. The transaction manager (TM) log entries contain timestamp information. For any timestamp Tn appearing in a transaction manager log entry Cn, the following condition is true: Cn−1.Tn<Cn.Tn<Cn+1.Tn< . . . The transaction builder and/or the transaction merger use the timestamp to order the log entries of the merged log. The order of the data manager log entries is the same as their order in the recovery log file.

Figure 12:
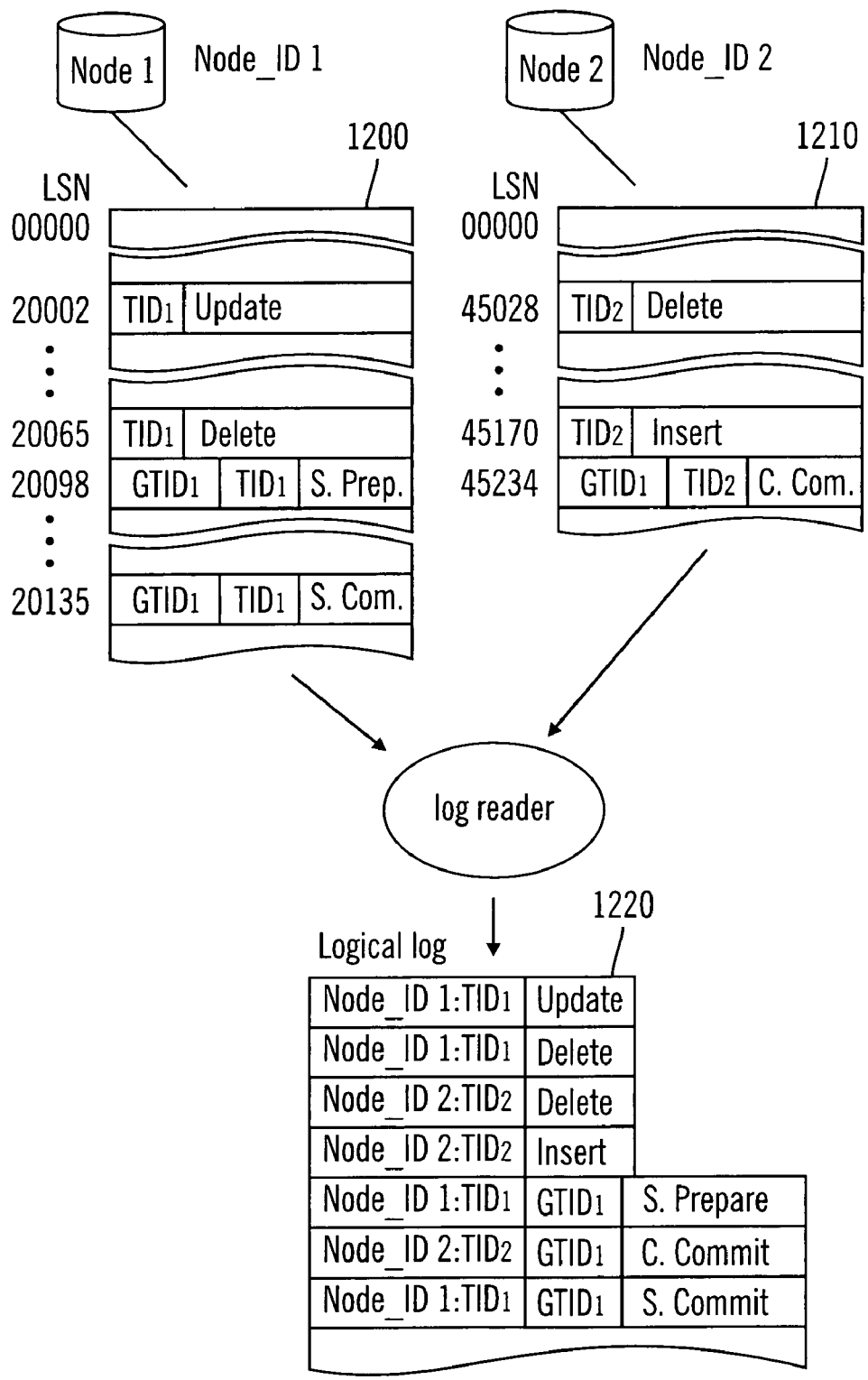
FIG. 12 illustrates the single log reader approach in accordance with certain implementations of the invention.

FIG. 12 illustrates the single log reader approach in accordance with certain implementations of the invention. The log reader reads multiple log files 1200 and 1210 and generates a single log file 1220. The single log reader associates to each node's recovery log the timestamp from the last transaction manager log entry that the single log reader has seen. The single log reader outputs into the merged, logical log the next entry from the physical log with the lowest, associated timestamp. The generated log file 1220 intersperses log entries from log files 1200 and 1210.

5.1 Building Local Transactions

From the single log entry sequence, or logical log, that has been generated by the single log reader technique, the MILE program builds local transactions. Since in DB2® EEE® there exist local and global transactions, the MILE program provides a log entry merging technique and a transaction merging technique. The log entry merging technique merges a node's log entries together to local transactions, and the transaction merging technique merges these local transactions back to global transactions.

Figure 13:
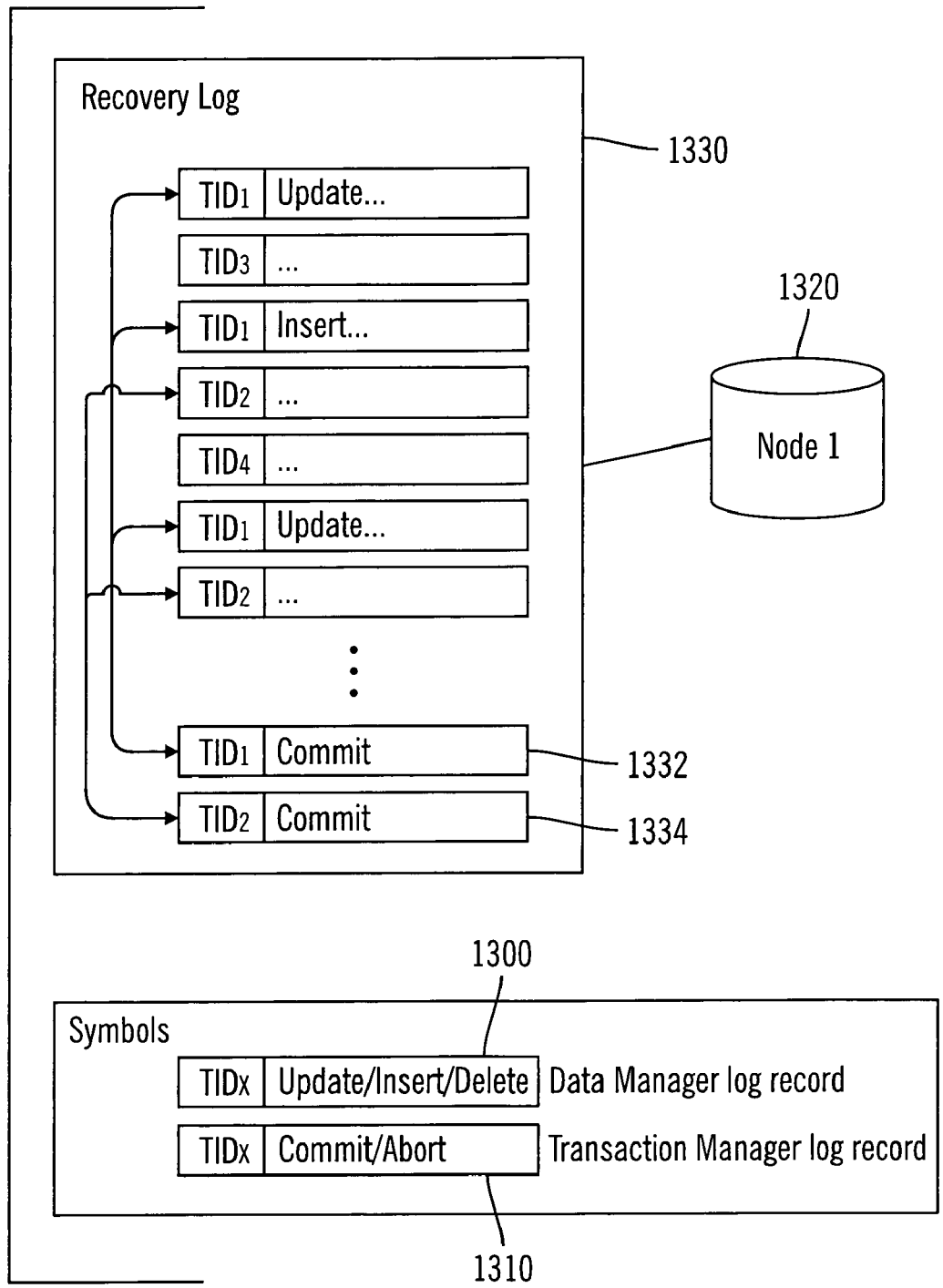
FIG. 13 illustrates a recovery log file for node with several log entries in accordance with certain implementations.
Figure 14:
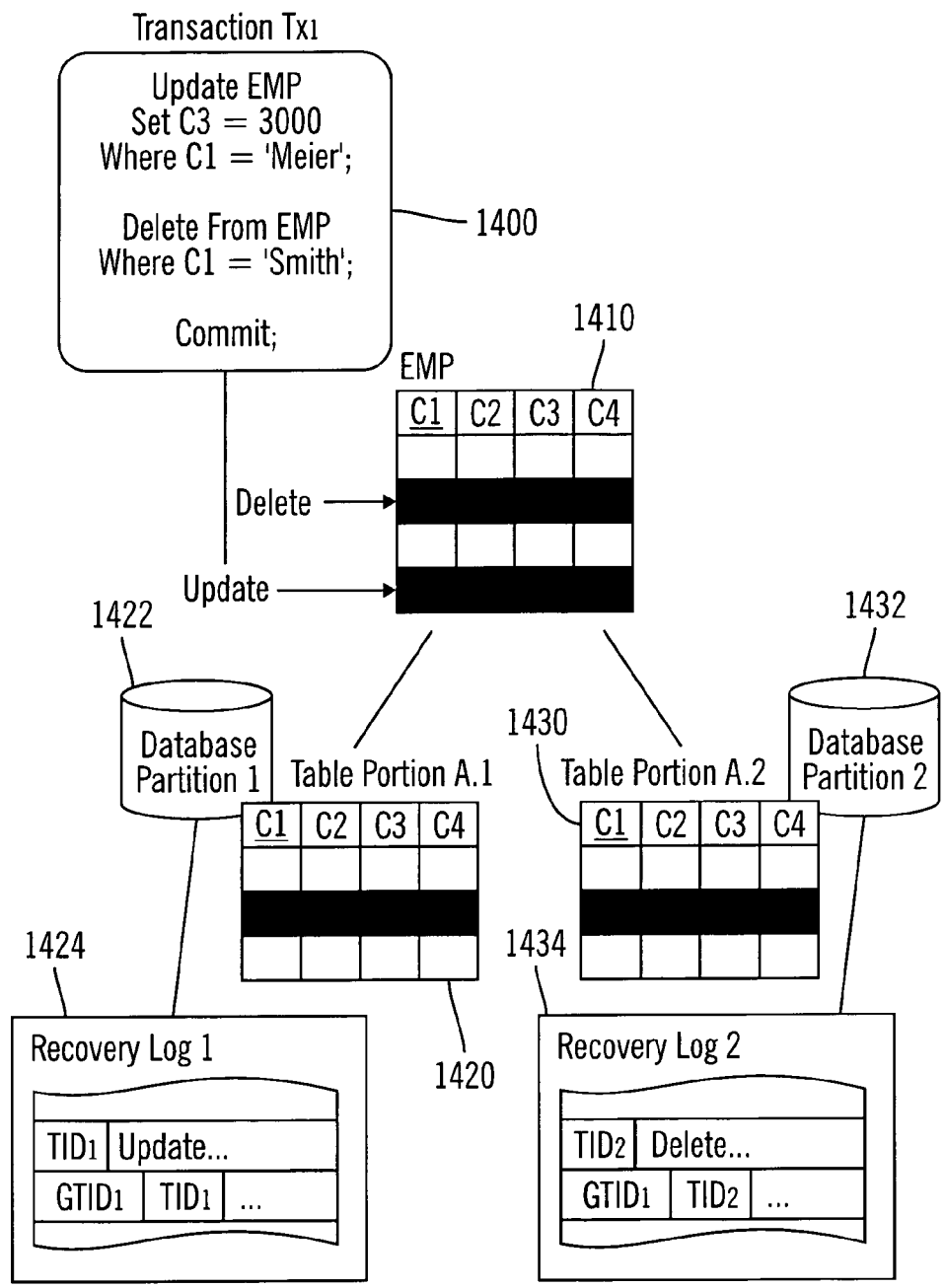
FIG. 14 illustrates an example of a global transaction generating multiple local transactions.

The MILE program builds local transactions by catenating log entries with identical transaction identifiers (TIDs), which is illustrated in FIG. 13 in accordance with certain implementations of the invention. FIG. 13 illustrates a recovery log file 1330 for node 1320 with several log entries. The log entries with identical TIDs were written by the same transaction. The TID is stored in each data manager (DM) and transaction manager (TM) log entry. A transaction identifier for a log entry that updates, inserts, or deletes data is associated with a data manager log entry 1300. A transaction identifier for a log entry that commits or aborts a transaction is associated with a transaction manager log entry 1310. Additionally, besides the local transaction identifier (TID), transaction manager log entries contain the global transaction identifier (GTID) of the global transaction. All transaction manager log entries for a same global transaction contain the same global transaction identifier value. Each TID is a node-local TID (rather than a global TID). The Commit log entries 1332 and 1334 with TID1 and TID2 indicate that the transactions had been successfully committed to the database.

While concatenating the log entries with identical TIDs, the MILE program maintains the log entry's local order. This order reflects the order the data changes took place in the node and is used to ensure data consistency.

5.2 Merging Local Transactions to Global Transactions

The building of the local and global transactions is performed by processing the single log entry sequence, which is the output of the single log reader technique. To reflect all the data changes that a distributed transaction made, the local transactions from the nodes are merged to a single, global transaction.

At the time a global transaction is executed against the distributed database, the global transaction generates at least one local transaction. If the local transaction is on the coordinator node, it is a solely local transaction, thus not global anymore. If at least one local transaction is on a node other than the coordinator node, i.e. on a subordinate node, the transaction is global.

FIG. 13 illustrates an example of a global transaction 1400 generating multiple local transactions. A global transaction Tx1 1400 performs a single row update and a delete on table EMP 1410. The table EMP 1410 resides in a partitioned DB2® EEE® database. In particular, portion A.1 1420 of table EMP 1410 resides in partition 1422 with recovery log file 1424. Portion A.2 1430 of table EMP 1410 resides in partition 1432 with recovery log file 1434. The table rows to be updated by the global transaction 1400 reside on different nodes 1422 and 1432. Since each node 1422 and 1432 records the changes that occurred on its own subset of the table EMP 1410, global transaction Tx1 1400 generates two local transactions 1Tx1 and 1Tx2, one for each node 1422 and 1432. Each local transaction has a transaction identifier (TID), TID1 and TID2. TID1 and TID2 can have the same value, or can be different, but each transaction identifier is unique within the node's recovery log file. In order to capture all data changes that were made by the global transaction Tx1 1400, the MILE program needs to capture local transactions, 1Tx1 and 1Tx2, from recovery log files 1424 and 1434 and merge them to form a global transaction.

From the type of the transaction manager (TM) log entry, the MILE program decides whether a transaction has been normal, local, or aborted. The type of the log entry is in the log entry that indicates the end of the transaction (e.g., a Commit entry). In DB2® EEE®, a TM log entry is one of the following types: Normal Commit, Normal Abort, MPP Prepare (also referred to as subordinate Prepare to Commit), or MPP Commit (also referred to as a coordinator commit).

With a Normal Commit log entry, the DBMS indicates that the transaction has been local on the node and no other nodes were involved in this transaction. This is a normal transaction. No merge of local transactions is necessary, since only this node was affected by the transaction.

A Normal Abort log entry indicates that the transaction has been aborted. Regardless of whether there have been other local transactions on other nodes, the transaction did not make any changes to the database. The capturing of this transaction can be discarded, since the DBMS performed a rollback at this point of time.

An MPP Prepare or MPP Commit log entry indicates that the DBMS had to perform a two-phase commit for this transaction. The MPP Prepare and MPP Commit are said to be of the kind related to the two-phase commit protocol. This means that there has been at least one more local transaction on another node, and the transaction is a local transaction that is part of a global transaction. Therefore the MILE program performs a transaction merge. The merge of local transactions is done using a second transaction identifier. Thus, in addition to a local transaction identifier, a MPP Prepare and MPP Commit log entries include a global transaction identifier ("global TID" or "GTID"). This global TID is stored in every MPP log entry, i.e. MPP Prepare and MPP Commit.

Figure 15:
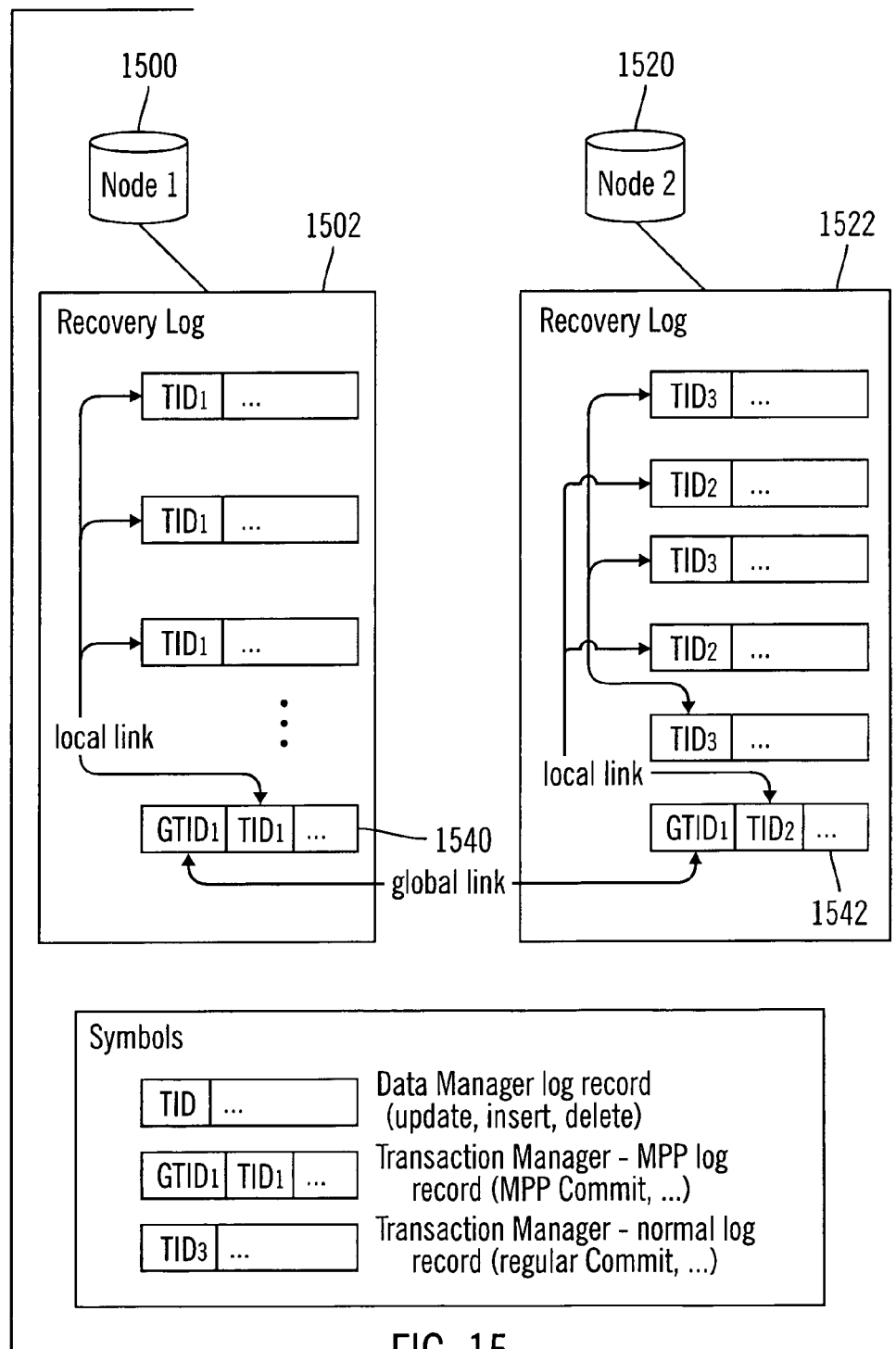
FIG. 15 illustrates an example for the local and the global TIDs in accordance with certain implementations of the invention.

FIG. 15 illustrates an example for the local and the global TIDs in accordance with certain implementations of the invention., In the example of FIG. 15, one global transaction generated two local transactions on node 1 1500 and node 2 1520. Node 1500 and 1520 have recovery log files 1502 and 1522, respectively. A global TID is added to a log entry for a MPP log entry. Both local transaction have different TIDs, TID1 and TID2, but a common GTID1 in log entries 1540 and 1542 indicates that both transactions have been generated by the same global transaction. Therefore, the MILE program merges transactions with log entries 1540 and 1542.

After the local transactions from the different nodes have been merged together to global transactions, the correct order of the global transactions among each other is determined by the MILE program. This order is the same order in which transactions have been committed to the source database. The MILE program determines the order using the timestamp in the transaction's transaction manager log entries (i.e., within a regular Commit or an MPP Commit or MPP Prepare log entry). In certain implementations, the data manager (DM) log entries do not contain a timestamp.

In certain implementations, DB2® EEE® uses the Lamport clock technique, and so the timestamps determine the partial ordering of the transactions. Based on this timestamp, the MILE program is able to determine that "log entry A happened before log entry B" without knowing at what time they were actually written. This statement is consistent throughout all nodes participating in the DB2® EEE® database and is sufficient for maintaining the right ordering among the transactions.

5.3 Handling Multiple Warmstart Positions

A warm start increases the performance of the MILE program by allowing the MILE program to continue processing where the MILE program left off at the last program termination. Since there are multiple recovery log files in a DB2® EEE® database, there are also multiple restart positions (i.e., entry points or starting points) for a warm start.

For a warmstart, the MILE program avoids capturing a transaction more than once. The MILE program also ensures that a transaction is not missed or read partially. There are three approaches to achieve these goals:

1. Store one MinInflightLSN (i.e., a starting point of log entries for a transaction) and one MaxCommitLSN (i.e., a log entry that holds the last commit) for each node separately. The MinInflightLSN is the earliest starting point for a node. The MaxCommitLSN is the commit for the last committed transaction for a set of transactions.
2. Store one MinInflightLSN for each node and a single MaxCommitTimestamp for all nodes.
3. Store one single MinInflightTimestamp and one single MaxCommitTimestamp for all nodes.

The first approach is the most straightforward approach, while the third approach is more complex. The third approach requires little update effort while updating the restart table, but requires more processing (e.g., since data needs to be converted into a timestamp) while starting up the MILE program. In certain implementations, the second approach was selected because it provides a good balance between the needed time for updating the restart table and the time necessary for the restart. The techniques of the invention are applicable to the first and third approaches.

In the DB2® EEE® case there are multiple recovery log files, and the LSNs can not be used to determine the ordering of the log entries. Also, each recovery log file has a set of restart information, since the MILE program reads the logs in different "speeds" (i.e., more log entries may be read from one log rather than another, depending on what is in each log). That is, the MILE program may be at different positions in different log files. Since the MILE program deals with several log files, the progress of the log reader within each log file is different whenever the MILE program terminates.

Figure 16:
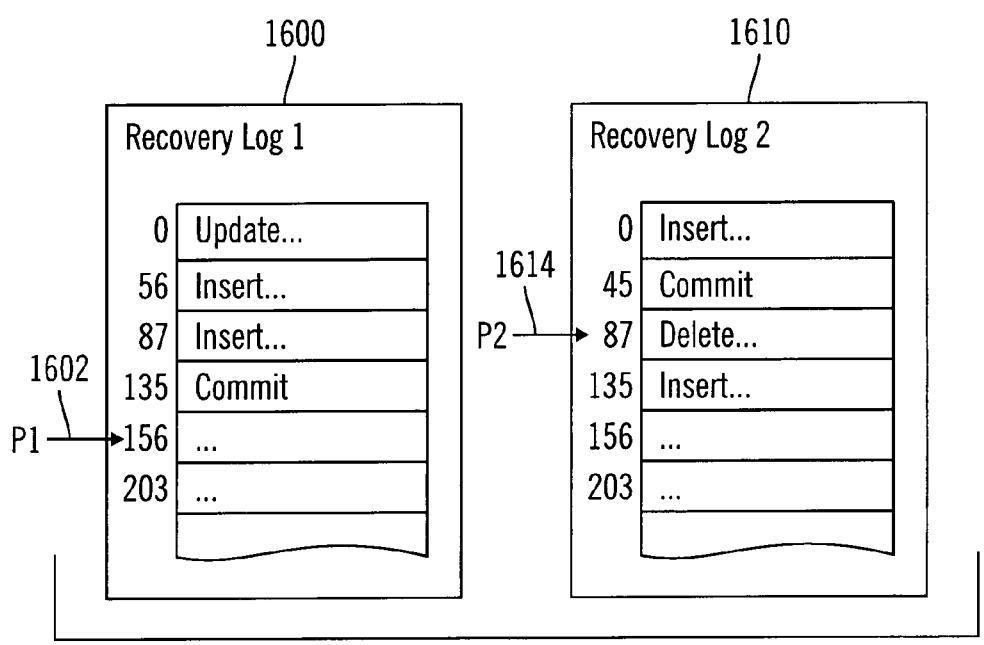
FIG. 16 illustrates the MILE program at different positions in different recovery log files in accordance with certain implementations of the invention.

The MILE program handles multiple restart positions. FIG. 16 illustrates the MILE program at different positions in different recovery log files in accordance with certain implementations of the invention. In particular, for recovery log file 1600, the MILE program is at position 1602, while for recovery log file 1610, the MILE program is at position 1614. For each node, the MILE program has a valid entry point. This entry point LSN provides an entry point in the log file, from which the MILE program can continue scanning the log, and a timestamp, from which the MILE program can determine whether a transaction has been previously processed.

Whenever the log read API hits the end of a node's recovery log file, the log read API returns an end-of-log (EOL) return code to the caller. In this case the DBMS did not write any new log entries to the recovery log file yet. With the return code, the log read API also returns a virtual timestamp (vts). The virtual timestamp is the timestamp the DBMS would have written at the time the EOL situation happened if a timestamp would have been needed.

Since the MILE program handles multiple recovery log files, the logic for handling an end-of-log (EOL) case differs from the Capture program 900 implementation due to the reading order of the recovery log files. Whenever the Capture program 900 encounters the end of a recovery log file, the log read API returns no more log entries from the recovery log file and returns a code for EOL. In certain implementations, although EOL is returned, DB2® may still be writing log entries to the recovery log files. For a DB2® EEE® database, it is possible that only one out of 10 log files reports an EOL situation. Regardless of how many log files report an EOL situation, the MILE program is able to handle the EOL situations. The MILE program gets a timestamp (e.g., a Lamport clock value) along with an EOL state. The timestamp is used to determine what activity is happening in logs relative to each other and which log should supply the next entry for the merged, logical log.

6. MILE Design

Figure 17:
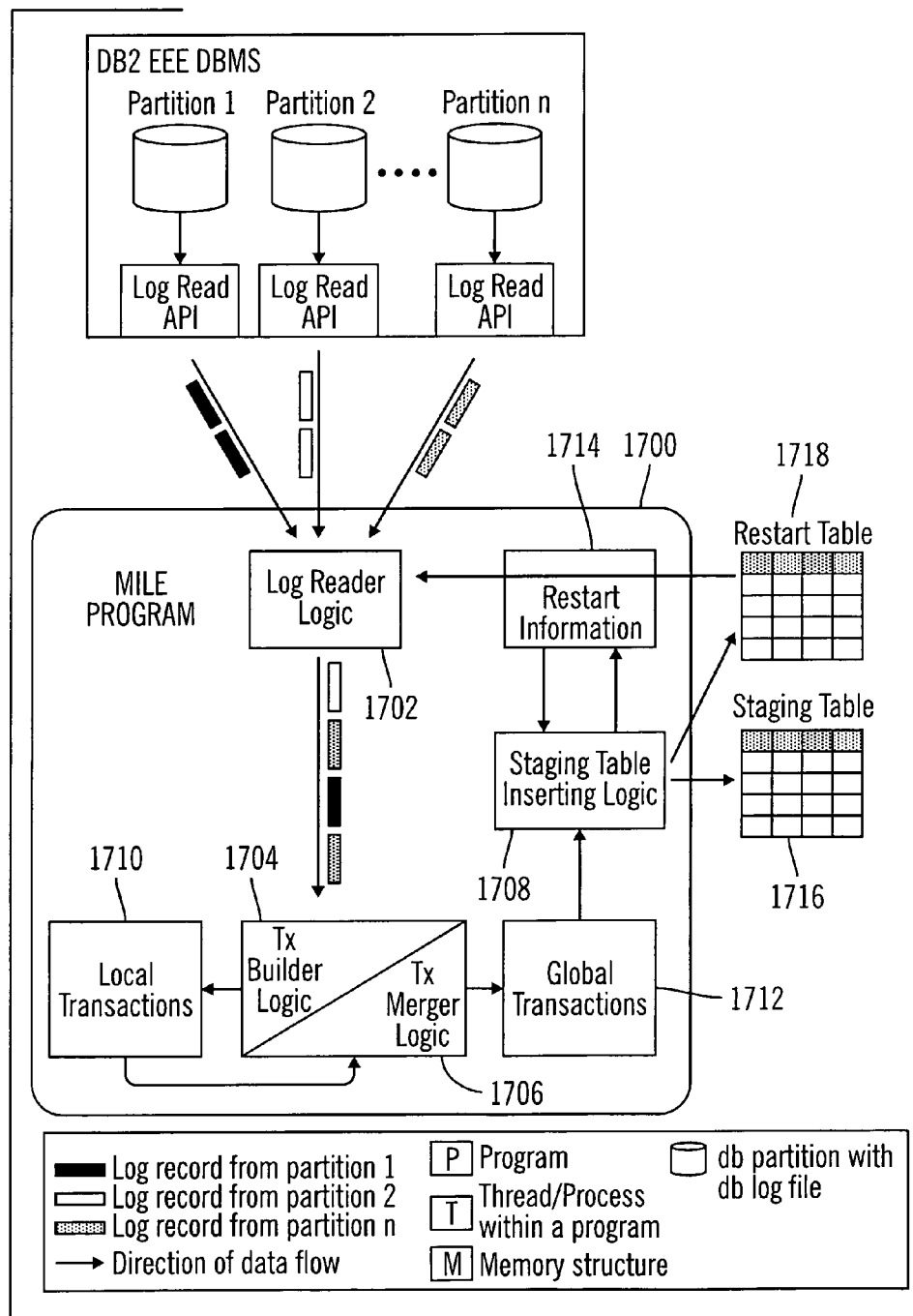
FIG. 17 illustrates components of a MILE program in accordance with certain implementations of the invention.

FIG. 17 illustrates components of a MILE program 1700 in accordance with certain implementations of the invention. The MILE program 1700 includes log reader logic 1702, transaction builder logic 1704, transaction merger logic 1706, and staging table inserting logic 1708.

The log reader logic 1702 retrieves data input of the MILE program 1700, i.e. the log entries of the node's recovery log files. The output of the log reader logic 1702 is a single log entry sequence which contains log entries.

From the output of the log reader logic (i.e., the single log entry sequence), the transaction builder logic 1704 builds local transactions 1710 and stores them into a local transaction memory structure for use by the transaction merger logic 1704. The transaction merger logic 1706 generates global transactions 1712 (i.e., creates a mapping from local to global transactions in the global transaction structure).

The staging table inserting logic 1708 uses staging table 1716 to store data from log entries, while restart table 1718 stores restart points for each one of multiple recovery log files. In certain implementations, the staging table inserting logic and restart logic may be combined into one component.

6.1 Log Reader

The log reader is responsible for MILE program's input. The log reader accesses the recovery log files and prepares the contents for the Transaction Builder. The log reader's functionality is to determine the nodes of the DB2® EEE® source database and connect to each node; to retrieve log entries from the nodes and concatenate them to a single log entry sequence; and to handle an end-of-log case while accessing the recovery log files.

To determine which nodes participate in the DB2® EEE® source database, the log reader reads a configuration file (e.g., 'DB2nodes.cfg' file) that is stored on each DB2® EEE® node. From this configuration file, the log reader determines the names of all nodes that belong to the DB2® EEE® source database. With the node's names, the log reader establishes a connection to each node. The log reader maintains connections to all the nodes, but, in certain implementations, one connection at a time is active. Within the active connection, the log reader calls the log read API to retrieve a node's log entries.

The log read logic within the log reader controls the access and scanning of the recovery log files. The log read logic determines which log will to be accessed next and how far the log will be scanned. The output of the technique is a single log entry sequence created from multiple recovery log files.

Figure 18A:
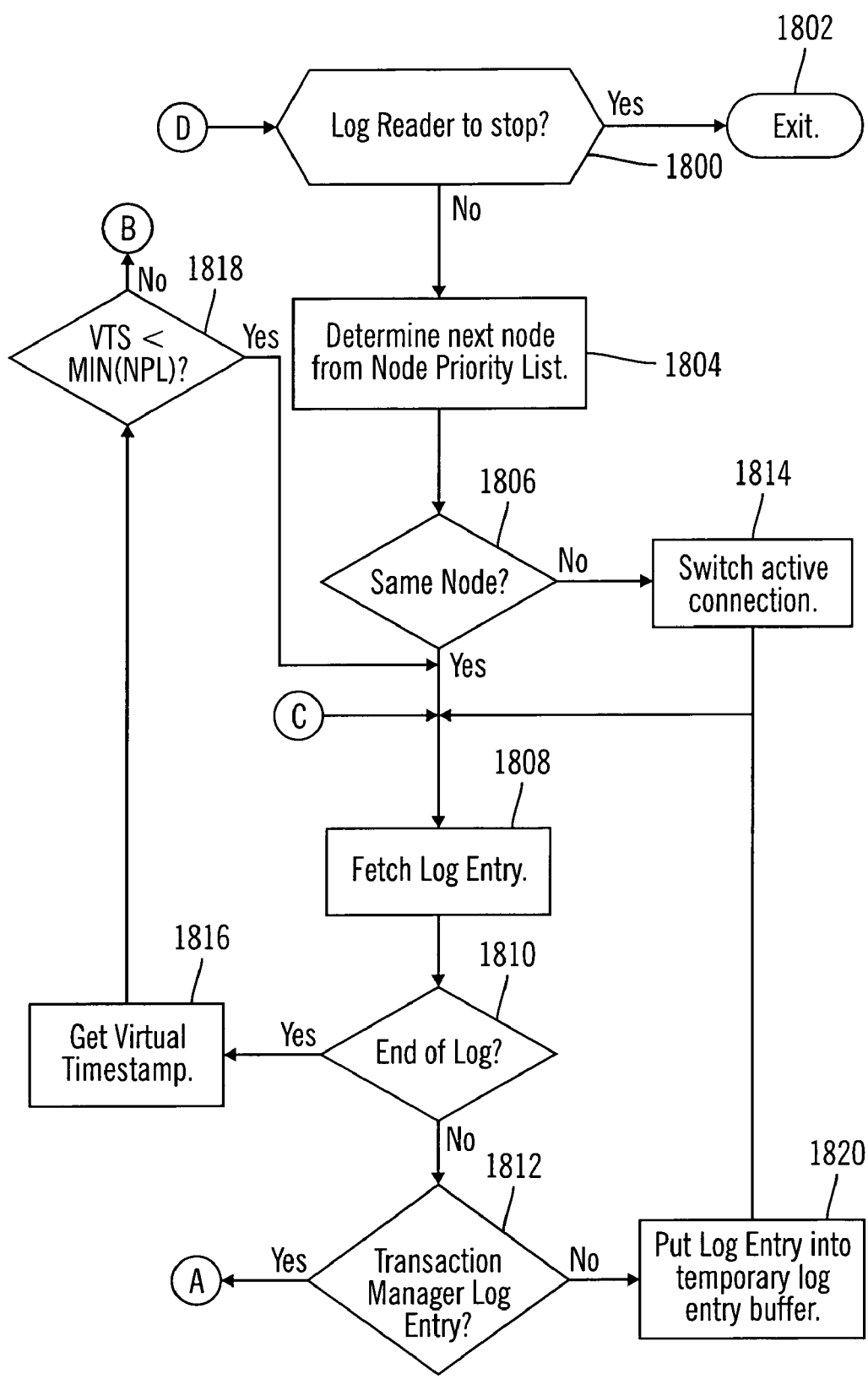
FIGS. 18A and 18B illustrate logic in the log reader in accordance with certain implementations of the invention.
Figure 18B:
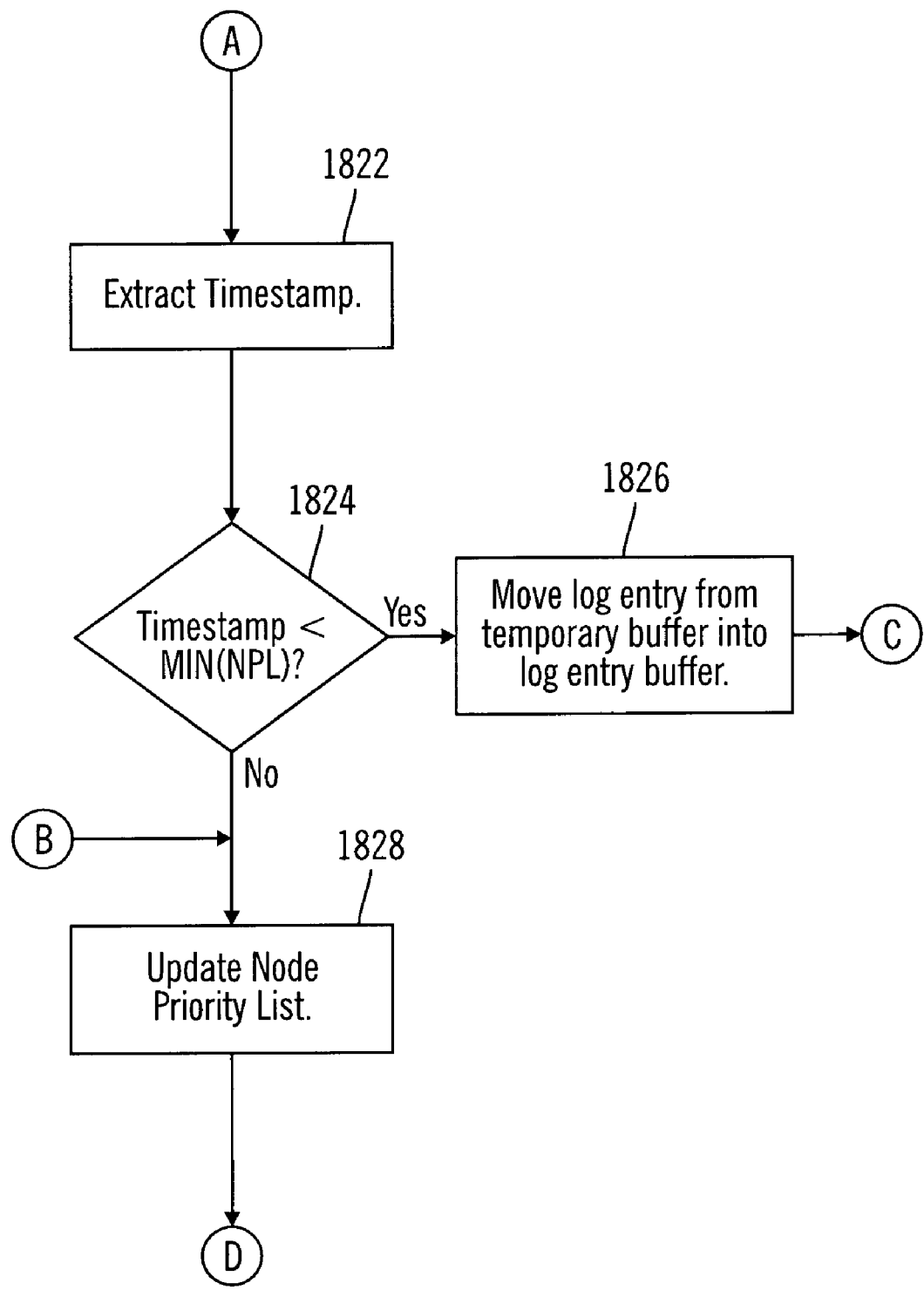

FIGS. 18A and 18B illustrate logic in the log reader in accordance with certain implementations of the invention. Control begins at block 1800 with the log reader determining whether it has stopped. If so, processing terminates at block 1802. Otherwise, processing continues to block 1804 where the log reader determines the next node from which a recovery log file should be read. The order is determined by a node priority list. In particular, the log reader selects the node in the node priority list whose timestamp entry is the lowest. The node priority list contains one timestamp entry for each node. The latest timestamp that the log reader encountered in the node's log is stored in the node priority list. On the initial startup of the MILE program, the node priority list is initialized with default values. In certain implementations, the default value is 0 for each node. In this case, where every node in the list is the one with the lowest timestamp, the order of reading the log files may be determined in various manners. The log reader may, for example, randomly pick a recovery log file and begin reading that recovery log file. The following is pseudocode for selecting the next node:

```
node_name* determine_next_node (NPL)
{
determine entry in NPL with MIN(timestamp);
return entry's node_name;
}
```

In block 1806, the log reader determines whether node picked from the node priority list is one that has been previously read by the log reader. In this case, the log reader does not need to switch the context/connection to the node and processing continues to block 1808. Otherwise, if it is a different node, the log reader switches the active connection to the new node (block 1814) and continues to block 1808. The following pseudocode may be used to determine whether to switch connections:

```
boolean same_node (node_name)
{
IF node_name = active_node_name
{ return TRUE; }
ELSE { return FALSE; }
}
Void switch_connection (node_name)
{
set current connection inactive;
switch connection to node_name;
set active_node_name = node_name;
}
```

In block 1808, the log reader fetches a log entry in the recovery log file of the selected node. For example, the log reader may call a log read API to retrieve the next log entry from the node. In certain implementations, the log read API returns multiple log entries to a log reader buffer. The log reader calls the log read API when the log reader buffer is empty. The log reader determines whether it is at the end of the recovery log file (block 1810). In particular, if no more log entries are in the recovery log file, the log reader receives an end-of-log indicator from the log read API. If a log entry is retrieved, processing continues to block 1812, otherwise, processing continues to block 1816.

In block 1812, the log reader determines whether the log entry was a transaction manager log entry. If so, processing continues to block 1822, otherwise, processing continues to block 1820. In block 1820, the log reader stores the log entry into a temporary log entry buffer and returns to block 1808 to fetch another log entry.

In block 1822, the log reader extracts a timestamp from the log entry. In block 1824, the log reader determines whether the timestamp is less than the minimum timestamp in the node priority list. If so, processing continues to block 1826, otherwise, processing continues to block 1828. In block 1826, the log reader moves the log entry from a temporary buffer to the log entry buffer and returns to block 1808 to fetch another log entry. In block 1828, the log reader updates the node priority list with the new timestamp entry value for the node and proceeds to block 1800.

Returning to block 1810, if the log reader received an end-of-log (EOL) condition, which occurs whenever the log read API does not return any more log entries because it has encountered the end of the node's recovery log file, processing continues to block 1816. In block 1816, the log reader receives a virtual timestamp from the log read API. The virtual timestamp is a timestamp that the DBMS would write at that moment and is referred to as a "virtual" timestamp. The "virtual" timestamp is used to determine whether the current active log should supply the logically next log record. If the "virtual" timestamp is the minimal timestamp of the node priority list, the MILE program repeatedly queries the log read API until the "virtual" timestamp is no longer the minimal timestamp of the node priority list or a newly added log entry is returned. If this timestamp is not the smallest one, the log reader continues with node priority list logic. When the log reader tries to read the log file (that reported the end-of-log before) later again, it is likely that another end-of-log condition will not occur.

In particular, in block 1818, the log reader determines whether the virtual timestamp is less than the minimum (i.e., smallest) timestamp in the node priority list. If so, processing continues to block 1808, otherwise processing continues to block 1828.

If the log reader encounters a data manager (DM) log entry, the record is stored in the log entry buffer (block 1820) and the log reader continues with reading the next log entry from the same log file. This loop is exited when the log reader reads a log entry of the transaction manager (TM) type.

6.2 Transaction Builder

In certain implementations, a log merger is used to concatenate log entries, while a transaction builder is used to build a transaction using one or more log entries. In certain implementations, the log merger and transaction builder may be merged to form one component.

Figure 19A:
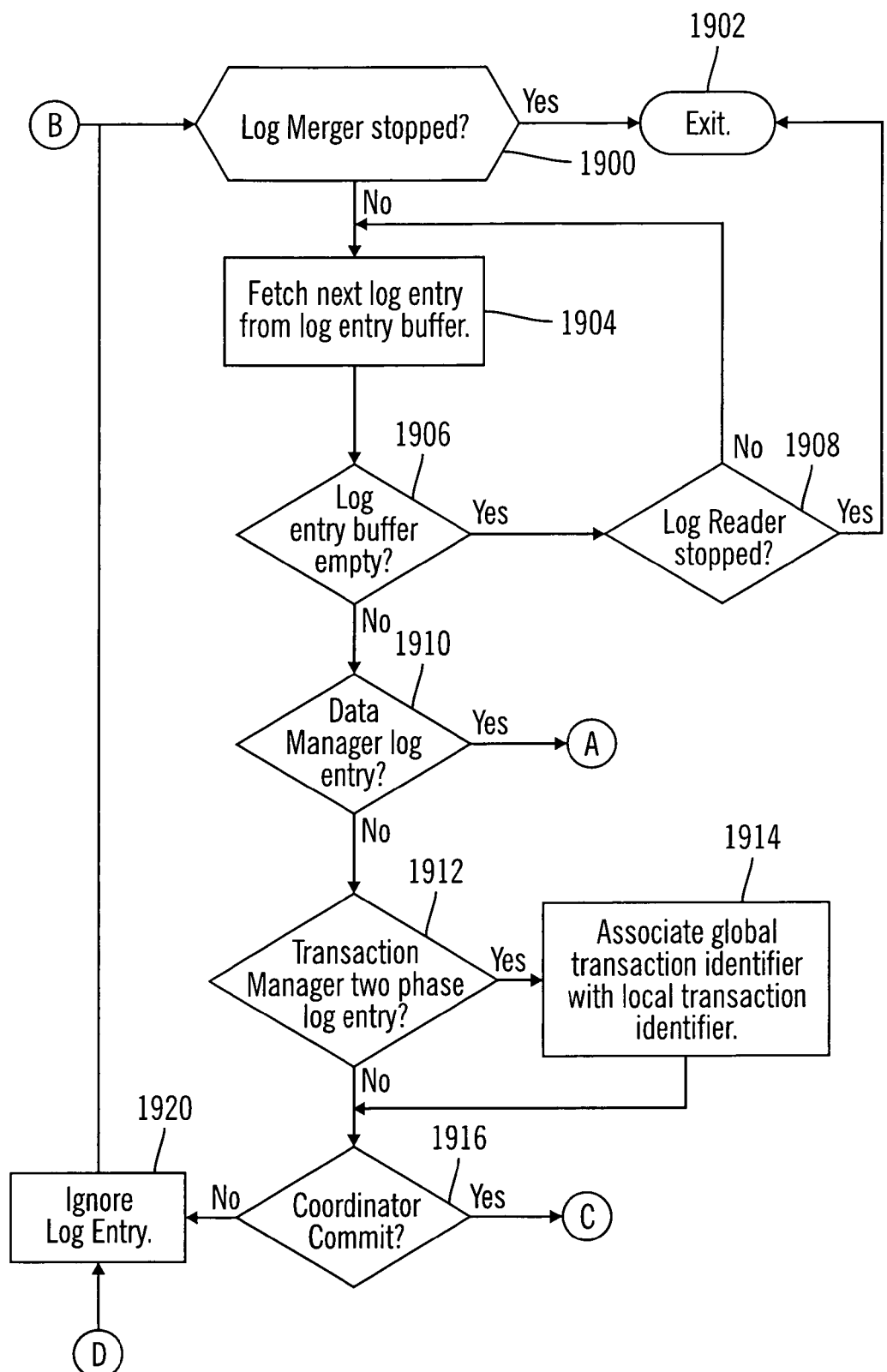
FIGS. 19A, 19B, and 19C illustrate logic performed by the transaction builder and log merger in accordance with certain implementations of the invention.
Figure 19B:
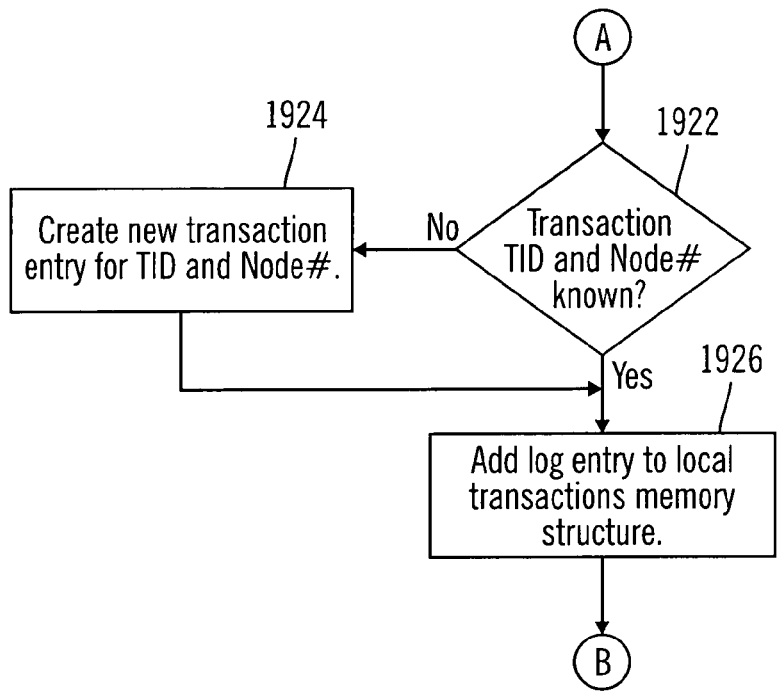
Figure 19C:
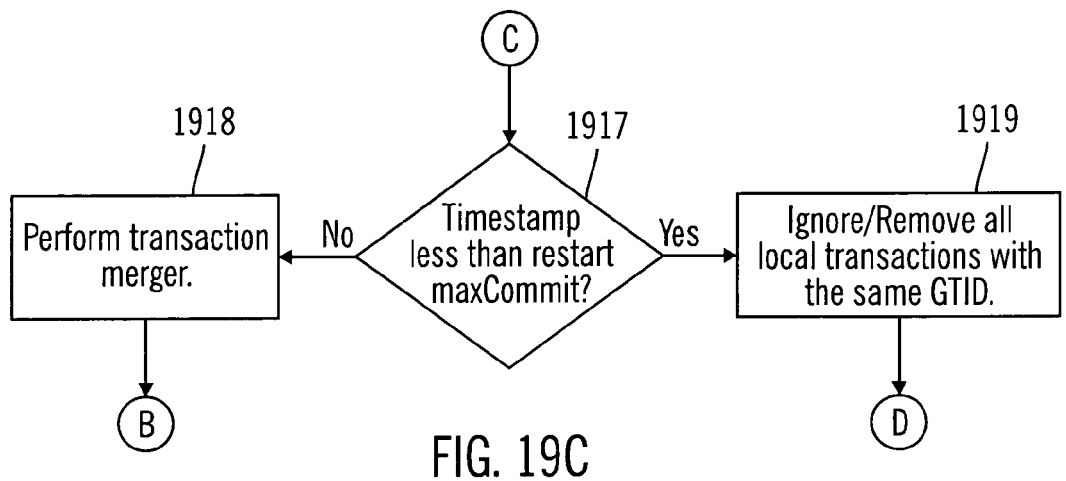

The transaction builder processes the output data structure, i.e. the log entry sequence of the log reader. The transaction builder builds the local transactions from the log entry sequence. FIGS. 19A, 19B, and 19C illustrate logic performed by the transaction builder and log merger in accordance with certain implementations of the invention. Control begins at block 1900 when the transaction builder determines whether the log merger has stopped. If the log merger has stopped, processing terminates at block 1902, otherwise, processing continues to block 1904. The log merger first reads a log entry from the log entry sequence (block 1904), which has been generated by the log reader and stored in a log entry buffer. In block 1906, the transaction builder determines whether the log entry buffer is empty. If the log entry buffer is empty (i.e., contains no more log entries), processing continues to block 1908, otherwise processing continues to block 1910. In block 1908, the log merger determines whether the log reader is stopped (i.e., whether the log reader is continuing to read log entries and add them to the log entry buffer). If the log reader has stopped, the log merger will stop (block 1902). If the log reader has not stopped, the log merger will fetch another log entry (block 1904). In particular, if the log entry buffer is empty, but the log reader is still running, it is likely that the log entry sequence will be filled with log entries again. In this case, the log merger sleeps for a while or waits for a wake up signal from the log reader.

Once the log merger retrieves a log entry from the log entry sequence, the log merger distinguishes between a data manager (DM) log entry and a transaction manager (TM) log entry. In block 1910, the log merger determines whether the log entry is a data manager log entry. If so processing continues to block 1922. Otherwise processing continues to block 1912.

In the case of a DM log entry, the log merger checks whether the transaction identifier (TID) for this node ID has already been stored (i.e., whether the TID and node number are known) (block 1922). If the TID is not known, the log merger creates a new transaction entry for this TID and node ID in the local transactions memory structure (block 1924). Once the entry has been created, or if the TID and node number are known, the log merger attaches the DM log entry information to the transaction in the local transactions memory structure (block 1926). After doing this, the log merger continues to block 1900.

In block 1912, the log merger determines whether the log entry is a transaction manager two-phase commit log entry. If so processing continues to block 1914. Otherwise, processing continues to block 1916. In block 1914, the log merger associates a global transaction identifier (GTID) with the local transaction identifier (TID) in the log entry.

In block 1916, the log merger determines whether the log entry indicates a commit from a coordinator node. If so, processing continues to block 1917, otherwise processing continues to block 1920. In block 1920, the log entry is ignored and processing continues to block 1900.

In block 1917, the log merger determines whether a timestamp is less than a restart maxCommit. If so, processing continues to block 1919, otherwise, processing continues to block 1918. If a commit has been received, transaction merger logic is started (block 1918) and processing continues to block 1900. That is, in case the log merger encounters a TM log entry (i.e., a commit), the log merger branches towards the transaction merger logic. In block 1919, the log merger ignores or removes all local transactions with the same GTID. In certain implementations, processing continues from block 1919 to block 1920. In certain implementations, processing continues from block 1919 to block 1900.

6.3 Transaction Merger

The transaction merger works on the set of local transactions that is created by the log merger. The transaction merger takes all local transactions belonging to a single global transaction and ties them together. From there on, the global transactions are ready for publishing to a staging table or to a persistent queue.

Before any local transactions can be merged together by the transaction merger, the transaction merger ensures that all local transactions have been built up by the log merger. When it comes to the merging of the local transactions, the log merger determines how many nodes participate in a transaction. This is needed so no local transaction information is missed. In certain implementations, the determination is based on the lowest captured timestamp of all log files and the MPP log entry ordering within DB2® EEE®. The smallest (i.e., earliest) "global" timestamp is referred herein as MinGlobalTS. MinGlobalTS is determined by a minimum technique working on the local transactions memory structure. In particular, the timestamp in the MPP Commit (i.e., coordinator Commit) log entry of any transaction is greater than the timestamps of MPP Prepare (i.e., a subordinate Prepare to Commit) log entries. That is, when a coordinator node commits, the coordinator node records a commit log entry in a recovery log file. When a subordinate node receives a Prepare to Commit from a coordinator node, the subordinate node records a Prepare to Commit log entry in a recovery log file. If the minimum timestamp of the node priority list is the timestamp of the coordinator commit log entry, all the local transactions for this global transaction have been captured.

Figure 20:
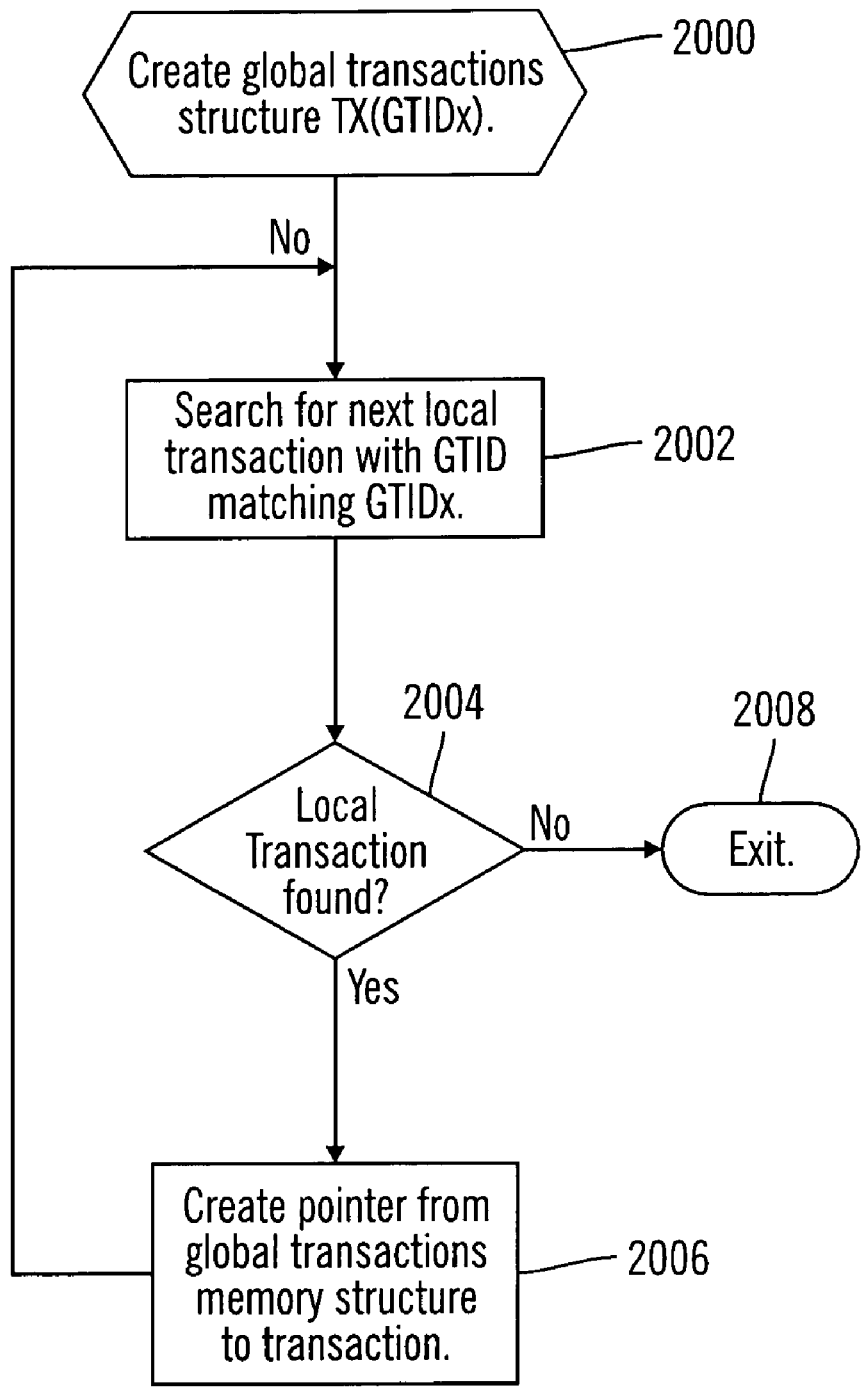
FIG. 20 illustrates logic performed by the transaction merger in accordance with certain implementations of the invention.

FIG. 20 illustrates logic performed by the transaction merger in accordance with certain implementations of the invention. Control begins at block 2000 with the transaction merger creating a global transactions structure referred to as TX(GTIDx). In block 2002, the local transactions list is searched for the next local transaction with a GTID matching the global transaction identifier (GTIDx). In block 2004, the transaction merger determines whether a local transaction was found. If none is found, processing terminates at block 2008, otherwise processing continues to block 2006. In block 2006, the transaction merger creates a pointer from the global transactions memory structure created in block 2000 to the local transaction structure for the local transaction identified in block 2002.

Figure 21:
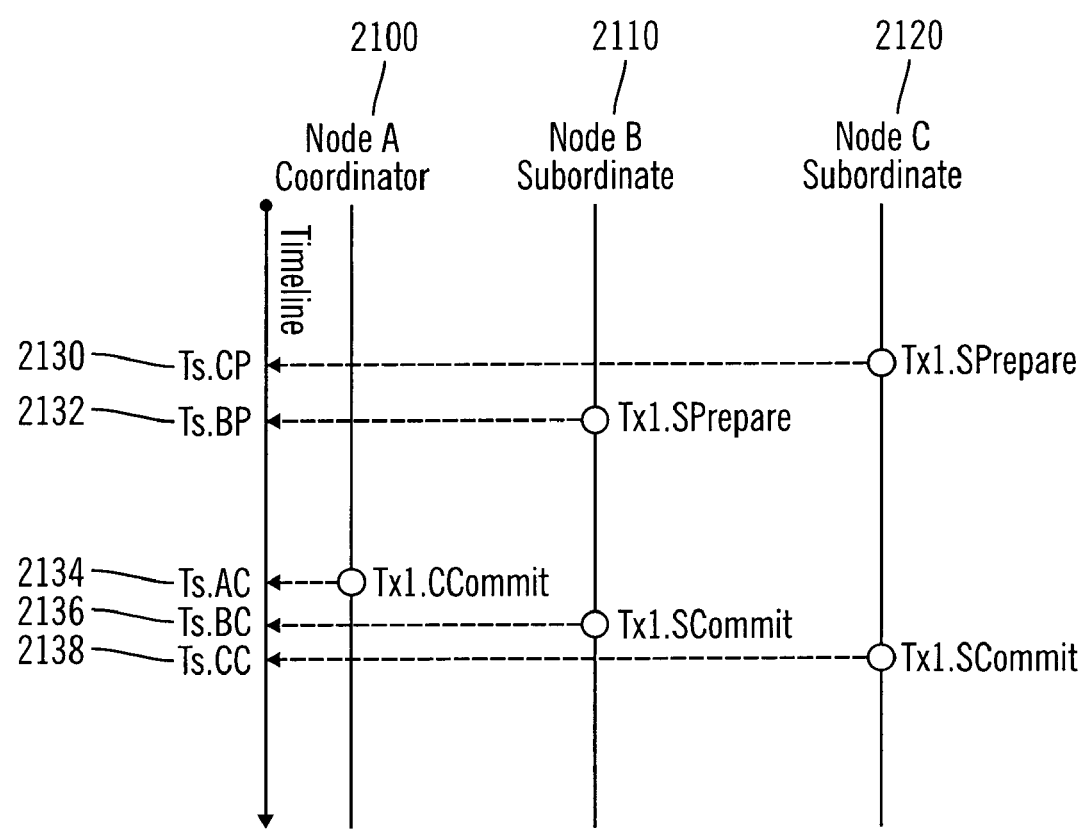
FIG. 21 illustrates MPP log entry ordering in accordance with certain implementations of the invention.

FIG. 21 illustrates MPP log entry ordering in accordance with certain implementations of the invention. Node A is a coordinator node 2100, while Nodes B 2110 and C 2120 are subordinate nodes. Node A 2100 sends a Prepare to Commit message to Nodes B 2110 and C 2120. Node C 2120 logs the Prepare to Commit message and sends a message Ts.CP 2130 to Node A 2100 that it has prepared to commit. Similarly, Node B 2110 logs the Prepare to Commit message from Node A 2100 and sends a message Ts.BP 2132 indicating that it is prepared to commit. Node A 2100 commits by writing a MPP Commit (i.e., a coordinator commit) log entry and sends a message Ts.AC 2134 indicating the commit. Node B 2110 commits and logs Ts.BC indicating the commit. Node C 2120 commits and logs Ts.CC 2138 indicating the commit.

Physically, the database consists of n nodes, where each node maintains a recovery log file. In order to capture the data changes from the source, the MILE program processes n recovery log files. The MILE program is also able to properly manage local and global transactions. In particular, the MILE program receives the multiple recovery log files as input. In certain implementations, the output of the MILE program matches the output of the Capture program 900 to ensure compatibility to the existing Apply program 910. For example, the structure of the staging tables remain unchanged. Likewise, the partitioning of the DB2® EEE® source database is transparent for the MILE program, since it is operating on the application level.

In summary, in certain implementations, the MILE program determines changes caused by a single transaction that spans multiple, physical database nodes and determines transaction order when transaction changes are recorded in multiple database recovery logs containing log entries in support of transaction recovery and the two-phase commit protocol. In particular, a globally unique transaction identifier for each transaction is recorded in the log entries pursuant to the two-phase commit protocol, and multiple log entries in multiple database recovery logs may correspond to one transaction. A causally ordered, ascending timestamp value is maintained in the log entries pursuant to the two-phase commit protocol. All log entries related to a single transaction in a single database recovery log are identically marked with a unique mark to the given transaction in the given recovery log. With this information, local and global transactions are identified. The log entries describe changes to the database made by application driven transactions.

The log entries of each recovery log are sequentially examined. A logically next log entry is the next log entry from a recovery log having a minimal preceding causally ordered, ascending timestamp in an entry of the kind related to the 2-phase commit protocol. The logically next database recovery log entries are combined into groups marked identically as belonging to a same transaction within a given one of the recovery logs, and the log entries of the combined group are ordered by the order dictated by the sequential examination. When a log entry of an MPP Prepare (i.e., a subordinate Prepare to Commit) entry kind or a MPP Commit (i.e., a coordinator commit) entry kind is encountered, a combined group of identically marked entries is identified as a completed combined group identified by globally unique transaction identifier (e.g., GTID). When a log entry of the MPP Commit (i.e., coordinator commit) entry kind is encountered, all completed combined groups identified by the globally unique transaction identifier are combined into a complete transaction, with the complete transaction being the next transaction in a transaction order.

When there is no sequentially next entry for one of the recovery logs (e.g., an end of log condition), the causually ordered, ascending timestamp value that would be maintained in a next log entry is generated.

In certain implementations, the causally ordered, ascending timestamp is the greater of a current time (e.g., based on Greenwich Mean Time (GMT)) or a number greater (e.g., one greater) than the last generated or observed causally ordered, ascending timestamp. That is, the timestamp generated is greater than any previously generated timestamp and also greater than any timestamp received in a message relating to the two phase commit protocol. The greater of the current time (e.g., GMT) and a number greater (e.g., one greater) than the last generated or observed causally ordered, ascending timestamp is passed in a two-phase commit protocol message or applied to transaction manager log entries.

In certain implementations, there are no recovery log entries of the coordinator commit kind, but an entry of single subordinate commit kind is available. In this case, local transactions and global transactions are formed upon receiving this kind of Commit.

In certain implementations, the MILE program coordinates the processing of complete transactions with specific log entries of each of several recovery logs. The MILE program is robust to system failures. In certain implementations, complete transactions are processed exactly once by recoverably updating a database or other recoverable object. Operations on a database are recoverable or nonrecoverable, and those that are recoverable may be applied to the database after, for example, a system failure. Thus, recoverably updating a database refers to updating the database so that it may be recovered. The address of the earliest entry point for a transaction which is not complete and not yet processed in each recovery log is recorded, along with the causally ordered, ascending timestamp of the log entry of the commit kind for the most recently completed and processed transaction. The recoverable changes of completed transactions, the earliest reported entry points for incomplete transactions (i.e., points in the recovery log at which an incomplete transaction would start upon a warm start), and the causally ordered, ascending timestamp are atomically committed, along with the recoverable changes pursuant to the processing of completed transactions (e.g., inserts into CD tables).

In certain implementations, a recovery log has no outstanding reported entries relating to an incomplete transaction (e.g., end of log or nothing to report). Then, the address of the next log entry that could be reported from that recovery log is recorded. That is, when processing stops while a transaction is incomplete (i.e., inflight), upon restart, the recovery log is read from the beginning of the earliest incomplete transaction and this beginning is an entry point that is recorded. Transactions that were completed and processed may occur while earlier log entries for incomplete transactions remain to be processed. Recoverably recording the global timestamp of the most recently completed and processed transaction allows avoiding the re-processing of completed transactions.

In certain implementations, the MILE program resumes determining changes and transaction order following a failure of normal termination. Initially, addresses of the earliest log entries for transactions which are not complete and the causally ordered, ascending timestamp are retrieved. Each of the recovery logs is examined at the retrieved addresses. Completed transactions whose causally ordered, ascending timestamp from a log entry of the commit kind is less than or equal to the retrieved causally ordered, ascending timestamp are not processed (i.e., they are ignored).

IBM, DB2, DPROPR, and EEE are trademarks of International Business Machines, Inc. of Armonk, N.Y.

Additional Implementation Details

The merging independent log entries technique may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The illustrated logic of FIGS. 1B, 18A, 18B, 19A, 19B, and 20 indicates certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

Figure 22:
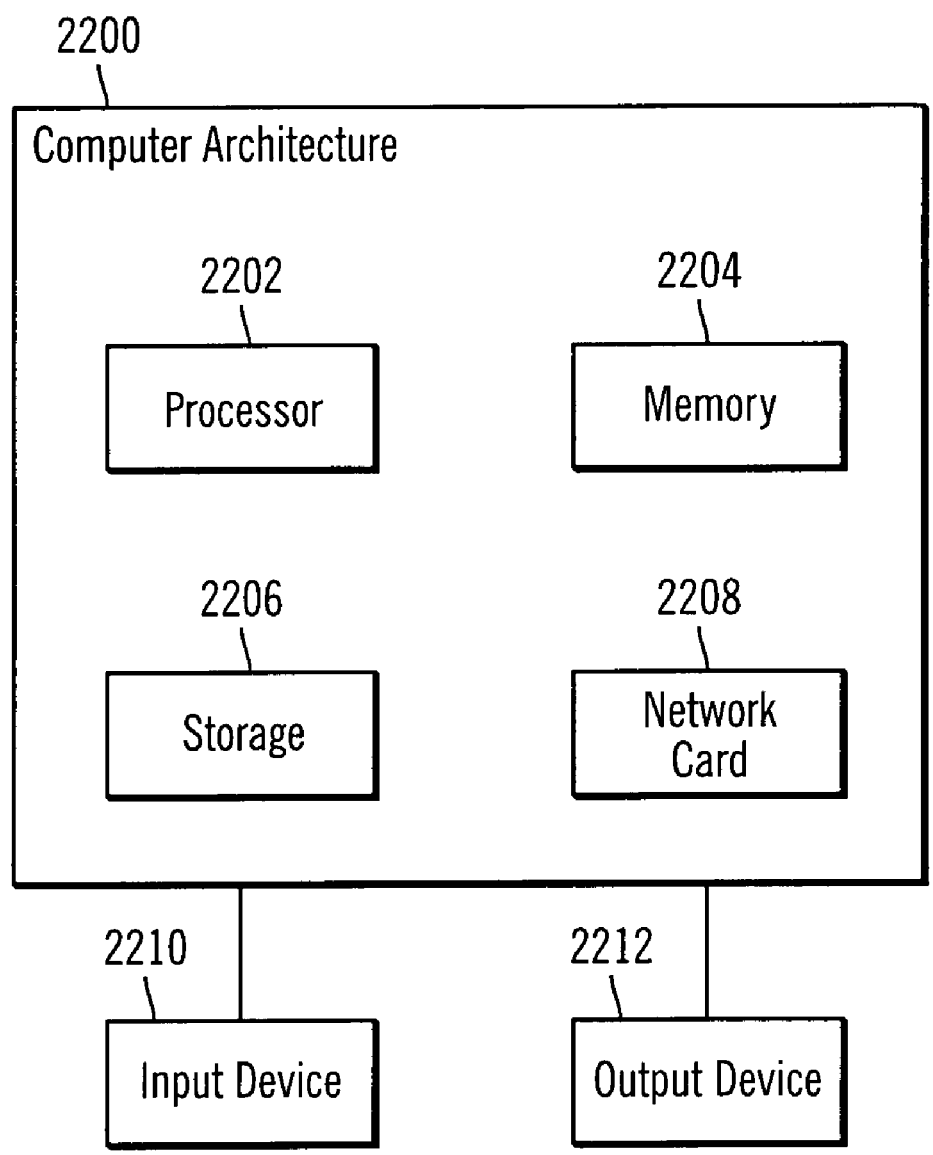
FIG. 22 illustrates one implementation of the architecture of a computer system on which the MILE program may be executed.

FIG. 22 illustrates one implementation of the architecture of a computer system on which the MILE program may be executed. The computer system may implement a computer architecture 2200 having a processor 2202 (e.g., a microprocessor), a memory 2204 (e.g., a volatile memory device), and storage 2206 (e.g., a non-volatile storage, such as magnetic disk drives, optical disk drives, a tape drive, etc.). The storage 2206 may comprise an internal storage device or an attached or network accessible storage. Programs in the storage 2206 are loaded into the memory 2204 and executed by the processor 2202 in a manner known in the art. The architecture further includes a network card 2208 to enable communication with a network. An input device 2210 is used to provide user input to the processor 2202, and may include a keyboard, mouse, pen-stylus, microphone, touch sensitive display screen, or any other activation or input mechanism known in the art. An output device 2212 is capable of rendering information transmitted from the processor 2202, or other component, such as a display monitor, printer, storage, etc. The MILE program may be stored in memory 2204 and is executable by processor 2202.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for merging log entries from multiple recovery logs, comprising:
  recording local transactions with log entries within each of the multiple recovery logs;
  recording causally ordered, ascending timestamp information for selected ones of the log entries in each of the multiple recovery logs, wherein the timestamp information is used to order global transactions;
  sequentially examining the log entries of each of the multiple recovery logs in an order based on the causally ordered, ascending timestamp information;
  merging the log entries from each of the multiple recovery logs that form local transactions to form global transactions; and
  outputting the merged log entries in the order of the causally ordered, ascending timestamp information.

2. The method of claim 1, wherein each recovery log entry for a single transaction includes a local transaction identifier.

3. The method of claim 1, wherein each recovery log entry of a transaction manager kind includes a global identifier.

4. The method of claim 1, wherein the selected ones of the log entries comprise transaction manager kind of log entries.

5. A method for restarting merging of recovery log entries from multiple recovery logs, comprising:
  bolding restart information in persistent recoverable storage for a restart, wherein the restart resumes replication of changes while not missing any of the recovery log entries and while capturing each of the recovery log entries once for a given logged transaction, and wherein the restart information includes log sequence numbers; and
  merging and processing each logged transaction using the restart information.

6. The method of claim 5, further comprising:
    storing an entry point for each of the multiple recovery log files.
7. The method of claim 6, further comprising:
    restarting processing of each of the multiple recovery log files at the entry point for that recovery log file.
8. The method of claim 5, further comprising:
    storing a global, ascending, causally ordered commit timestamp of a last processed transaction.
9. The method of claim 8, wherein a transaction for which the global, ascending, causally ordered timestamp is smaller than a stored global, ascending, causally ordered timestamp is not merged or processed.
10. A system for merging log entries from multiple recovery logs, comprising:
    a set of nodes, each node having a recovery log; and
    a computer program executable by a computer, wherein the computer program comprises instructions for:
        recording local transactions with log entries within each of the multiple recovery logs;
        recording causally ordered, ascending timestamp information for selected ones of the log entries in each of the multiple recovery logs, wherein the timestamp information is used to order global transactions;
        sequentially examining the log entries of each of the multiple recovery logs in an order based on the causally ordered, ascending timestamp information;
        merging the log entries from each of the multiple recovery logs that form local transactions to form global transactions; and
        outputting the merged log entries in the order of the causally ordered, ascending timestamp information.
11. The system of claim 10, wherein each recovery log entry for a single transaction includes a local transaction identifier.
12. The system of claim 10, wherein each recovery log entry of a transaction manager kind includes a global identifier.
13. The system of claim 10, wherein the selected ones of the log entries comprise transaction manager kind of log entries.
14. A system for restarting merging of recovery log entries from multiple recovery logs, comprising:
    a set of nodes, each node having a recovery log; and
    a computer program executable by a computer, wherein the computer program comprises instructions for:
        holding restart information in persistent recoverable storage for a restart, wherein the restart resumes replication of changes while not missing any of the recovery log entries and while capturing each of the recovery log entries once for a given logged transaction, and wherein the restart information includes log sequence numbers; and
        merging and processing each logged transaction using the restart information.
15. The system of claim 14, wherein the computer program further comprises instructions for:
    storing an entry point far each of the multiple recovery log files.
16. The system of claim 15, wherein the computer program further comprises instructions for:
    restarting processing of each of the multiple recovery log files at the entry point for that recovery log file.
17. The system of claim 15, wherein the computer program further comprises instructions for:
    storing a global, ascending, causally ordered commit timestamp of a last processed transaction.
18. The system of claim 17, wherein a transaction for which the global, ascending, causally ordered timestamp is smaller than a stored global, ascending, causally ordered timestamp is not merged or processed.
19. An article of manufacture including code for merging log entries from multiple recovery logs, wherein the code is capable of causing operations, the operations comprising:
    recording local transactions with log entries within each of the multiple recovery logs;
    recording causally ordered, ascending timestamp information for selected ones of the log entries in each of the multiple recovery logs, wherein the timestamp information is used to order global transactions;
    sequentially examining the log entries of each of the multiple recovery logs in an order based on the causally ordered, ascending timestamp information;
    merging the log entries from each of the multiple recovery logs that form local transactions to form global transactions; and
    outputting the merged log entries in the order of the causally ordered, ascending timestamp information.
20. The article of manufacture of claim 19, wherein each recovery log entry for a single transaction includes a local transaction identifier.
21. The article of manufacture of claim 19, wherein each recovery log entry of a transaction manager kind includes a global identifier.
22. The article of manufacture of claim 19, wherein the selected ones of the log entries comprise transaction manager kind of log entries.
23. An article of manufacture including code for restarting the merging of recovery log entries from multiple recovery logs, wherein the code is capable of causing operations, the operations comprising:
    holding restart information in persistent recoverable storage for a restart, wherein the restart resumes replication of changes while not missing any of the recovery log entries and while capturing each of the recovery log entries once for a given logged transaction, and wherein the restart information includes log sequence numbers; and
    merging and processing each logged transaction using the restart information.
24. The article of manufacture of claim 23, wherein the operations further comprise;
    storing an entry point for each of the multiple recovery log files.
25. The article of manufacture of claim 24, wherein the operations further comprise:
    restarting processing of each of the multiplee recovery log files at the entry point for that recovery log file.
26. The article of manufacture of claim 23, wherein the operations further comprise:
    storing a global, ascending, causally ordered commit timestamp of a last processed transaction.
27. The article of manufacture of claim 26, wherein a transaction for which the global, ascending, causally ordered timestamp is smaller than a stored global, ascending, causally ordered timestamp is not merged or processed.

* * * * *